United States Patent
Chung et al.

(10) Patent No.: US 11,716,163 B2
(45) Date of Patent: Aug. 1, 2023

(54) INTER-CELL INTERFERENCE MITIGATION METHOD IN DYNAMIC TIME DIVISION DUPLEX ENVIRONMENT, AND ELECTRONIC DEVICE FOR SAME

(71) Applicant: Samsung Electronics Co., Ltd., Suwon-si (KR)

(72) Inventors: Wonsuk Chung, Suwon-si (KR); Jongmin Baik, Suwon-si (KR); Kyunghoon Lee, Suwon-si (KR); Sangho Lee, Suwon-si (KR); Hyejeong Kim, Suwon-si (KR); Suyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 17/283,927

(22) PCT Filed: Sep. 19, 2019

(86) PCT No.: PCT/KR2019/012104
§ 371 (c)(1),
(2) Date: Apr. 8, 2021

(87) PCT Pub. No.: WO2020/075980
PCT Pub. Date: Apr. 16, 2020

(65) Prior Publication Data
US 2021/0399821 A1 Dec. 23, 2021

(30) Foreign Application Priority Data

Oct. 8, 2018 (KR) .................. 10-2018-0119895

(51) Int. Cl.
*H04J 11/00* (2006.01)
*H04L 5/14* (2006.01)
(Continued)

(52) U.S. Cl.
CPC .......... *H04J 11/005* (2013.01); *H04B 7/0408* (2013.01); *H04B 7/088* (2013.01); *H04L 5/14* (2013.01)

(58) Field of Classification Search
CPC .... H04B 7/0408; H04B 7/0695; H04B 7/088; H04J 11/005; H04L 5/0023; H04L 5/0073; H04L 5/14; H04L 5/1469; H04L 5/146
See application file for complete search history.

(56) References Cited

U.S. PATENT DOCUMENTS

2002/0068590 A1 6/2002 Suzuki et al.
2005/0174954 A1 8/2005 Yun et al.
(Continued)

FOREIGN PATENT DOCUMENTS

CN 101778392 A 7/2010
CN 104272799 A 1/2015
(Continued)

OTHER PUBLICATIONS

LG Electronics, "Discussion on mechanism for NR RIM support", 3GPP TSG RAN WG1 Meeting #94bis, Oct. 8-12, 2018, R1-1810291, 11 pages.
(Continued)

*Primary Examiner* — Derrick V Rose

(57) ABSTRACT

The present invention provides an electronic device for mitigating inter-cell interference in a dynamic TDD environment, the electronic device including: at least one antenna array including antenna elements; and a processor configured to use the antenna array and form a plurality of reception beams having mutually different directions, wherein at least one processor may enable: a first beam pair link to be formed with a first transmission beam emitted from a first base station by using a first reception beam having a first direction; information about a first TDD
(Continued)

pattern indicating a TDD sequence set in a serving cell formed by the first base station and information about a second TDD pattern indicating a TDD sequence set in an adjacent cell adjacent to a serving cell formed by a second base station to be acquired; a first portion of the first TDD pattern to be selected on the basis of the information about the first TDD pattern and the information about the second TDD pattern; the detection of whether interference has occurred in the first portion; and a second beam pair link to be formed with one among transmission beams emitted from the second base station by using a second reception beam having a second direction different from the first direction, when the interference is determined to have occurred.

15 Claims, 15 Drawing Sheets

(51) Int. Cl.
*H04B 7/0408* (2017.01)
*H04B 7/08* (2006.01)

(56) References Cited

U.S. PATENT DOCUMENTS

| | | | |
|---|---|---|---|
| 2007/0081480 A1* | 4/2007 | Cai | H04W 4/06 370/312 |
| 2011/0286370 A1 | 11/2011 | Tang et al. | |
| 2015/0078227 A1 | 3/2015 | Kong | |
| 2016/0143042 A1* | 5/2016 | Nagata | H04W 72/0446 370/329 |
| 2017/0171791 A1 | 6/2017 | Li et al. | |
| 2018/0167179 A1 | 6/2018 | Huang et al. | |
| 2018/0227102 A1 | 8/2018 | John Wilson et al. | |
| 2018/0288757 A1 | 10/2018 | Sun et al. | |
| 2018/0302176 A1 | 10/2018 | Jeon et al. | |
| 2019/0149253 A1* | 5/2019 | Yoon | H04B 7/2621 370/252 |
| 2019/0363810 A1* | 11/2019 | Luo | H04W 24/10 |
| 2020/0162207 A1* | 5/2020 | Hwang | H04L 1/1812 |

FOREIGN PATENT DOCUMENTS

| | | |
|---|---|---|
| KR | 10-2002-0043155 A | 6/2002 |
| KR | 10-2017-0043355 A | 4/2017 |
| WO | 2018135986 A1 | 7/2018 |

OTHER PUBLICATIONS

AT&T, "Closed Loop LBT for License Assisted NR in Unlicensed Bands", 3GPP TSG RAN WG1 Meeting 92bis, Apr. 16-20, 2018, R1-1804665, 5 pages.

International Search Report dated Jan. 9, 2020 in connection with International Patent Application No. PCT/K2019/012104, 2 pages.

Written Opinion of the International Searching Authority dated Jan. 9, 2020 in connection with International Patent Application No. PCT/KR2019/012104, 5 pages.

Korean Intellectual Property Office, "Office Action," dated Feb. 14, 2023, in connection with Korean Patent Application No. 10-2018-0119895, 17 pages.

ETRI, "URLLC based on grant-based Dynamic TDD," 3GPP TSG RAN WG1 Meeting #91, R1-1720232, Reno, USA, Nov. 27-Dec. 1, 2017, 4 pages.

* cited by examiner

INTER-CELL INTERFERENCE MITIGATION METHOD IN DYNAMIC TIME DIVISION DUPLEX ENVIRONMENT, AND ELECTRONIC DEVICE FOR SAME

CROSS-REFERENCE TO RELATED APPLICATIONS

This application is a 371 of International Application No. PCT/KR2019/012104 filed on Sep. 19, 2019, which claims priority to Korean Patent Application No. 10-2018-0119895 filed on Oct. 8, 2018, the disclosures of which are herein incorporated by reference in their entirety.

BACKGROUND

1. Field

Various embodiments of the present disclosure relate to a method for mitigating inter-cell interference in a dynamic time division duplex (TDD) environment, and an electronic device for the same.

2. Description of Related Art

To meet demand for wireless data traffic that is on an increasing trend after the commercialization of 4th-generation (4G) communication systems, the standardization of 5th-generation (5G) next radio (NR) systems is under progress.

To achieve a high data rate, the implementation of the 5G communication systems at not only a band of 6 Giga or less but also an ultra high frequency (mmWave) band (for example, a 60 Giga (60 GHz) band) similarly with LTE are being considered. To increase the mitigation of a path loss of an electronic wave and a propagation distance of the electronic wave at the ultra high frequency band, the 5G communication system is discussing the implementation of a beamforming technology in a terminal as well as a base station. Also, compared to a time division duplex (TDD) scheme supported in the existing long term evolution (LTE) system, 5G new radio (NR) is proposing a more dynamic TDD scheme such as duplex change by the unit of symbol, allowing TDD patterns setting for each user, etc.

In a dynamic time division duplex (TDD) environment, there can occur many cases in which TDD patterns set between adjacent cells are different, and when duplex between two cells are different, an uplink signal by an adjacent-cell electronic device can exert interference on a downlink signal to a reference electronic device. At this time, when a distance between the electronic devices is close, performance degradation by interference can be deepened, and a communication quality can be deteriorated.

Various embodiments of the present disclosure can provide various methods for mitigating inter-cell interference in a dynamic TDD environment, and an electronic device for the same.

SUMMARY

According to various embodiments of the present disclosure, an electronic device can include a housing, at least one antenna array including antenna elements disposed within the housing or formed in a portion of the housing, a processor electrically or operably connected with the antenna array, and configured to form a plurality of reception beams (Rx beams) having mutually different directions by using the antenna array, and a memory operably connected with the at least one processor. The memory can store instructions of, at execution, enabling the at least one processor to form a first beam pair link with a first transmission beam radiated from a first base station by using a first reception beam having a first direction, acquire information about a first time division duplex (TDD) pattern indicating a TDD sequence set in a serving cell formed by the first base station, and information about a second TDD pattern indicating a TDD sequence set in an adjacent cell adjacent to a serving cell formed by a second base station, select an interference occurrable duration among the first TDD pattern on the basis of the information about the first TDD pattern and the information about the second TDD pattern, obtain whether interference has occurred in the interference occurrable duration, and form a second beam pair link with one of transmission beams radiated from the second base station by using a second reception beam having a second direction different from the first direction, in response to the interference being determined to have occurred.

According to various embodiments of the present disclosure, an operating method of an electronic device can include forming a first beam pair link with a first transmission beam radiated from a first base station by using a first reception beam having a first direction, acquiring information about a first time division duplex (TDD) pattern indicating a TDD sequence set in a serving cell formed by the first base station, and information about a second TDD pattern indicating a TDD sequence set in an adjacent cell adjacent to a serving cell formed by a second base station, selecting an interference occurrable duration among the first TDD pattern on the basis of the information about the first TDD pattern and the information about the second TDD pattern, obtaining whether interference has occurred in the interference occurrable duration, and forming a second beam pair link with one of transmission beams radiated from the second base station by using a second reception beam having a second direction different from the first direction, in response to the interference being determined to have occurred.

A method of various embodiments and an electronic device for the same can prevent the deterioration of performance of the electronic device by mitigating or avoiding, through reception beam adjustment and/or bandwidth part (BWP) change, inter-cell interference capable of occurring at a time duration in which duplex are different mutually with an adjacent cell in a dynamic time division duplex (TDD) environment.

DETAILED DESCRIPTION

Various embodiments are described below in detail with reference to the accompanying drawings.

Figure 1:
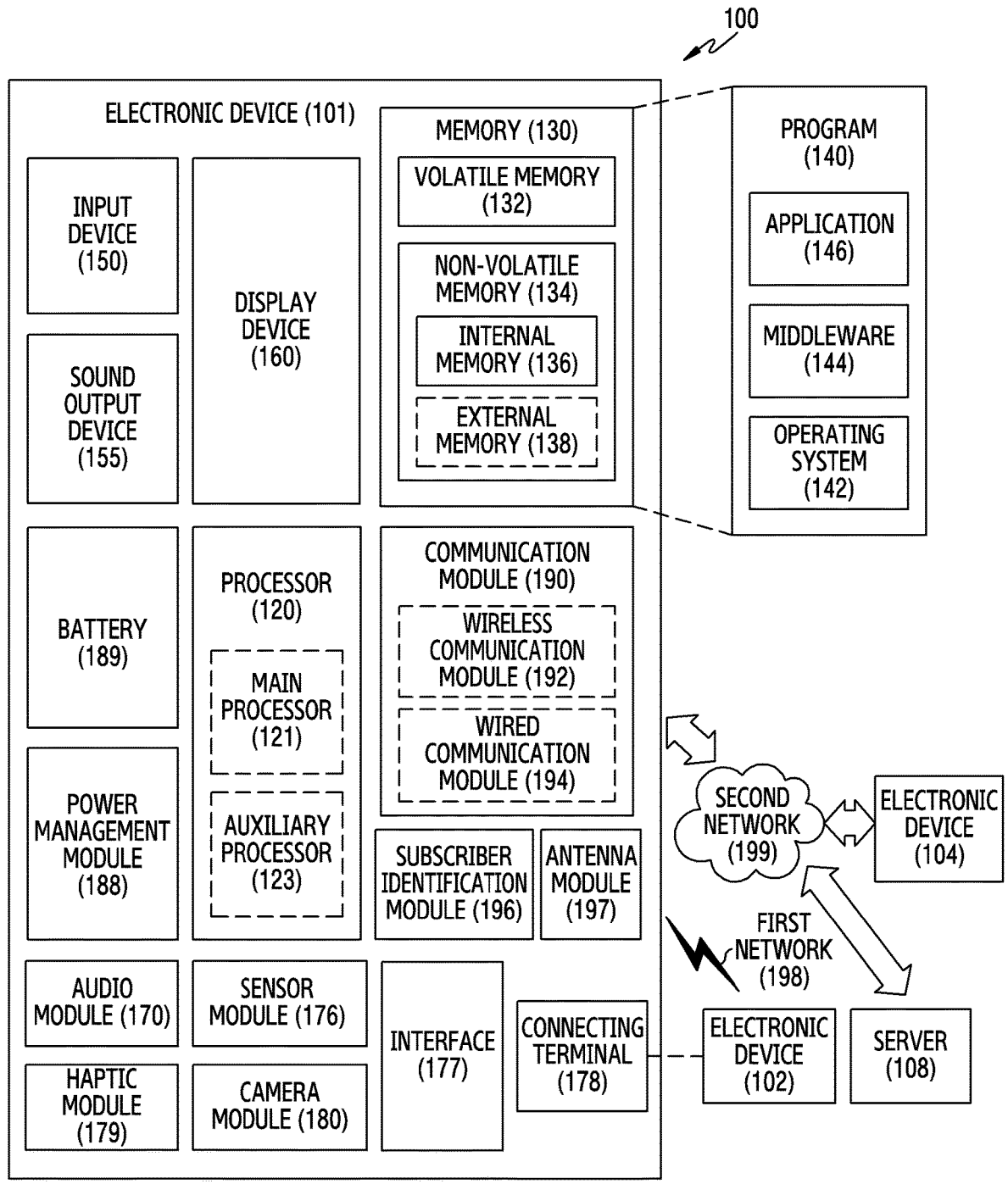
FIG. 1 is a block diagram of an electronic device within a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
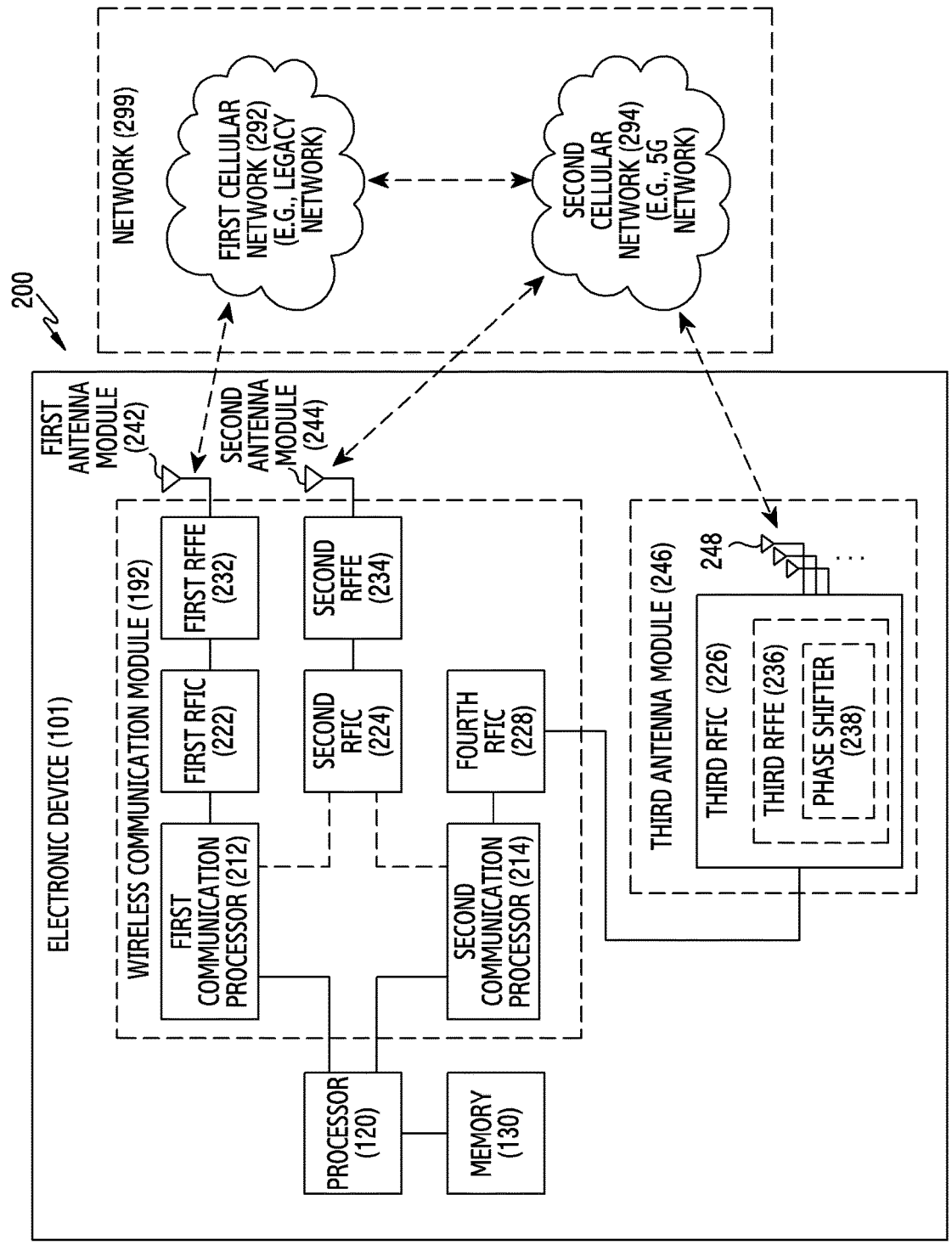
FIG. 2 is a block diagram of an electronic device for supporting legacy network communication and 5th-generation (5G) network communication according to various embodiments.

FIG. 2 is a block diagram 200 illustrating an example electronic device 101 in a network environment including a plurality of cellular networks according to various embodiments.

Referring to FIG. 2, an electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor (e.g., including processing circuitry) 120 and a memory 130. The second network 199 may include a first cellular network 292 and a second cellular network 294. According to another embodiment, the electronic device may further include at least one of the parts shown in FIG. 1 and the second network 199 may further include at least one another network. According to an embodiment, the first communication processor 212, the second communication processor 214, the first RFIC 222, the second RFIC 224, the fourth RFIC 228, the first RFFE 232, and the second RFFE 234 may form at least a portion of a wireless communication module 192. According to another embodiment, the fourth RFIC 228 may be omitted or may be included as a portion of the third RFIC 226.

The first communication processor 212 can support establishment of a communication channel with a band to be used for wireless communication with the first cellular network 292 and legacy network communication through the established communication channel. According to various embodiments, the first cellular network may be a legacy network including a 2G, 3G, 4G, or Long-Term Evolution (LTE) network. The second communication processor 214 can support establishment of a communication channel corresponding to a designated band (e.g., about 6 GHz-~about 60 GHz) of a band to be used for wireless communication with the second cellular network 294 and 5G network communication through the established communication channel. According to various embodiments, the second cellular network 294 may be a 5G network that is defined in 3GPP. Further, according to an embodiment, the first communication processor 212 or the second communication processor 214 can support establishment of a communication channel corresponding to another designated band (e.g., about 6 GHz or less) of a band to be used for wireless communication with the second cellular network 294 and 5G network communication through the established communication channel. According to an embodiment, the first communication processor 212 and the second communication processor 214 may be implemented in a single chip or a single package. According to various embodiments, the first communication processor 212 or the second communication processor 214 may be disposed in a single chip or a single package together with the processor 120, the auxiliary processor 123, or the communication module 190. According to an embodiment, the first communication processor 212 and the second communication processor 214 is directly or indirectly connected by an interface (not shown), thereby being able to provide or receive data or control signal in one direction or two directions.

The first RFIC 222, in transmission, can converts a baseband signal generated by the first communication processor 212 into a radio frequency (RF) signal of about 700 MHz to about 3 GHz that is used for the first cellular network 292 (e.g., a legacy network). In reception, an RF signal can be obtained from the first cellular network 292 (e.g., a legacy network) through an antenna (e.g., the first antenna module 242) and can be preprocessed through an RFFE (e.g., the first RFFE 232). The first RFIC 222 can covert the preprocessed RF signal into a baseband signal so that the preprocessed RF signal can be processed by the first communication processor 212.

The second RFIC 224 can convert a baseband signal generated by the first communication processor 212 or the second communication processor 214 into an RF signal in a Sub6 band (e.g., about 6 GHz or less) (hereafter, 5G Sub6 RF signal) that is used for the second cellular network 294 (e.g., a 5G network). In reception, a 5G Sub6 RF signal can be obtained from the second cellular network 294 (e.g., a 5G network) through an antenna (e.g., the second antenna module 244) and can be preprocessed through an RFFE (e.g., the second RFFE 234). The second RFIC 224 can convert the processed 5G Sub6 RF signal into a baseband signal so that the processed 5G Sub6 RF signal can be processed by a corresponding communication processor of the first communication processor 212 or the second communication processor 214.

The third RFIC 226 can convert a baseband signal generated by the second communication processor 214 into an RF signal in a 5G Above6 band (e.g., about 6 GHz~about 60 GHz) (hereafter, 5G Above6 RF signal) that is used for the second cellular network 294 (e.g., a 5G network). In reception, a 5G Above6 RF signal can be obtained from the second cellular network 294 (e.g., a 5G network) through an antenna (e.g., the antenna 248) and can be preprocessed through the third RFFE 236. The third RFIC 226 can covert the preprocessed 5G Above6 RF signal into a baseband signal so that the preprocessed 5G Above6 RF signal can be processed by the second communication processor 214. According to an embodiment, the third RFFE 236 may be provided as a portion of the third RFIC 226.

The electronic device 101, according to an embodiment, may include a fourth RFIC 228 separately from or as at least a portion of the third RFIC 226. In this case, the fourth RFIC 228 can convert a baseband signal generated by the second communication processor 214 into an RF signal in an intermediate frequency band (e.g., about 9 GHz~about 11 GHz) (hereafter, IF signal), and then transmit the IF signal to the third RFIC 226. The third RFIC 226 can convert the IF signal into a 5G Above6 RF signal. In reception, a 5G Above6 RF signal can be received from the second cellular network 294 (e.g., a 5G network) through an antenna (e.g., the antenna 248) and can be converted into an IF signal by the third RFIC 226. The fourth RFIC 228 can covert the IF signal into a baseband signal so that IF signal can be processed by the second communication processor 214.

According to an embodiment, the first RFIC 222 and the second RFIC 224 may be implemented as at least a portion of a single chip or a single package. According to an embodiment, the first RFFE 232 and the second RFFE 234 may be implemented as at least a portion of a single chip or a single package. According to an embodiment, at least one of the first antenna module 242 or the second antenna module 244 may be omitted, or may be combined with another antenna module and can process RF signals in a plurality of bands.

According to an embodiment, the third RFIC 226 and the antenna 248 may be disposed on a substrate, thereby being able to form a third antenna module 246. For example, the wireless communication module 192 or the processor 120 may be disposed on a first substrate (e.g., a main PCB). In this case, the third RFIC 226 may be disposed in a partial area (e.g., the bottom) and the antenna 248 may be disposed in another partial area (e.g., the top) of a second substrate (e.g., a sub PCB) that is different from the first substrate, thereby being able to form the third antenna module 246. By disposing the third RFIC 226 and the antenna 248 on the same substrate, it is possible to reduce the length of the transmission line therebetween. Accordingly, it is possible to reduce a loss (e.g., attenuation) of a signal in a high-frequency band (e.g., about 6 GHz~about 60 GHz), for example, which is used for 5G network communication, due to a transmission line. Accordingly, the electronic device 101 can improve the quality and the speed of communication with the second cellular network 294 (e.g., 5G network).

According to an embodiment, the antenna 248 may be an antenna array including a plurality of antenna elements that can be used for beamforming. In this case, the third RFIC 226, for example, as a portion of the third RFFE 236, may include a plurality of phase shifters 238 corresponding to the antenna elements. In transmission, the phase shifters 238 can convert the phase of a 5G Above6 RF signal to be transmitted to the outside of the electronic device 101 (e.g., to a base station of a 5G network) through the respectively corresponding antenna elements. In reception, the phase shifters 238 can convert the phase of a 5G Above6 RF signal received from the outside through the respectively corresponding antenna element into the same or substantially the same phase. This enables transmission or reception through beamforming between the electronic device 101 and the outside.

The second cellular network 294 (e.g., a 5G network) may be operated independently from (e.g., Stand-Along (SA)) or connected and operated with (e.g., Non-Stand Along (NSA)) the first cellular network 292 (e.g., a legacy network). For example, there may be only an access network (e.g., a 5G radio access network (RAN) or a next generation RAN (NG RAN)) and there is no core network (e.g., a next generation core (NGC)) in a 5G network. In this case, the electronic device 101 can access the access network of the 5G network and then can access an external network (e.g., the internet) under control by the core network (e.g., an evolved packed core (EPC)) of the legacy network. Protocol information (e.g., LTE protocol information) for communication with a legacy network or protocol information (e.g., New Radio (NR) protocol information) for communication with a 5G network may be stored in the memory 230 and accessed by another part (e.g., the processor 120, the first communication processor 212, or the second communication processor 214).

Figure 3:
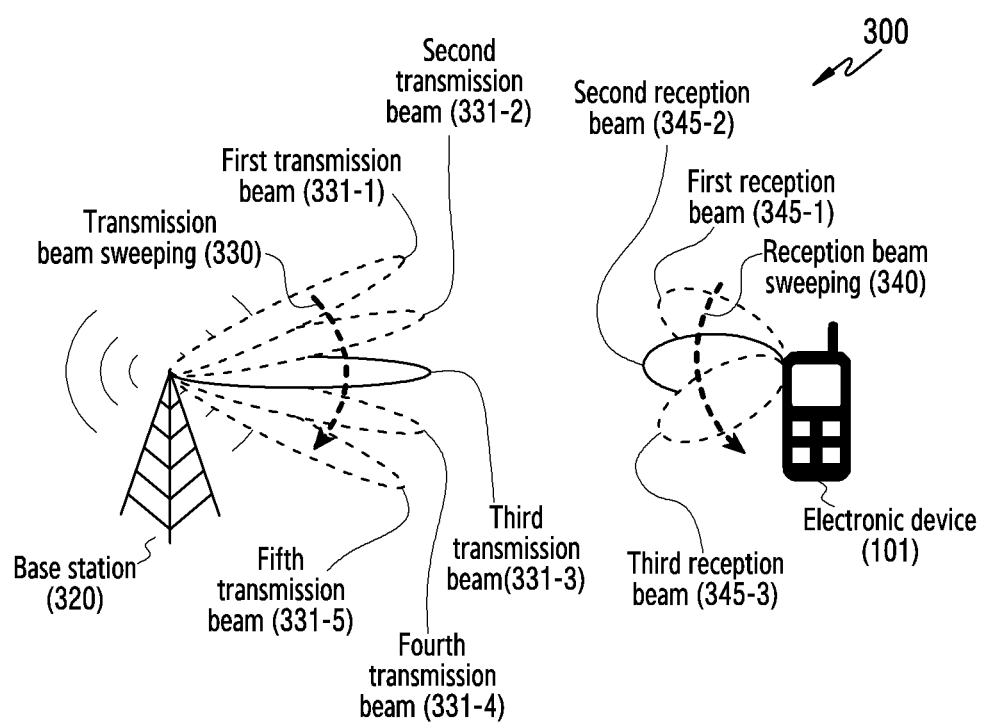
FIG. 3 is a diagram illustrating an embodiment of an operation for wireless communication connection between a base station and an electronic device, in a second network of FIG. 2, which uses a directive beam for the sake of wireless connection.

FIG. 3 is a diagram 300 illustrating an embodiment of an operation for wireless communication connection between a base station 320 and an electronic device 101, in the second network 294 (for example, 5G network) of FIG. 2, which uses a directive beam for the sake of wireless connection.

Firstly, the base station (gNodeB (gNB) or transmission reception point (TRP)) 320 can perform a beam detection operation with the electronic device 101 for the sake of wireless communication connection. In an illustrated embodiment, for the purpose of beam detection, the base station 320 can perform at least single transmission beam sweeping 330, by sequentially transmitting a plurality of transmission beams, for example, first to fifth transmission beams 331-1 to 331-5 whose directions are different.

The first to fifth transmission beams 331-1 to 331-5 can include at least one synchronization sequences (SS)/physical broadcast channel (PBCH) block. The SS/PBCH block can be used for measuring a channel, or a beam intensity, of the electronic device 101 by periods.

In another embodiment, the first to fifth transmission beams 331-1 to 331-5 can include at least one channel state information-reference signal (CSI-RS). The CSI-RS is a criterion/reference signal able to be flexibly set by the base station 320, and can be transmitted in a periodic/semi-persistent or aperiodic manner. By using the CSI-RS, the electronic device 101 can measure the channel and/or the beam intensity.

The transmission beams can form a radiation pattern having a selected beam pattern. For example, the transmission beams can have a broad radiation pattern having a first beam width, or a sharp radiation pattern having a second beam width sharper than the first beam width. For example, the transmission beams including the SS/PBCH block can have a broader radiation pattern than the transmission beams including the CSI-RS.

While the base station 320 performs the transmission beam sweeping 330, the electronic device 101 can perform reception beam sweeping 340. For example, while the base station 320 performs the first transmission beam sweeping 330, the electronic device 101 can fix a first reception beam 345-1 to a first direction, to receive a signal of the SS/PBCH block transmitted by at least one of the first to fifth transmission beams 331-1 to 331-5. While the base station 320 performs the second transmission beam sweeping 330, the electronic device 101 can fix a second reception beam 345-2 to a second direction, to receive signals of the SS/PBCH blocks transmitted by the first to fifth transmission beams 331-1 to 331-5. As above, the electronic device 101 can select beam pairs of communicatable reception beams (e.g., the second reception beam 345-2) and transmission beams (e.g., the third transmission beam 331-3), based on a result of an operation of signal reception through the reception beam sweeping 340.

As above, after the communicatable transmission reception beam pairs are determined, the base station 320 and the electronic device 101 can transmit and/or receive basic information for cell setting and, on the basis of this, can set additional information for beam management. For example, the beam management information can include detailed information about a set beam, the SS/PBCH block, the CSI-RS, or setting information about an additional reference signal.

Also, the electronic device 101 can continuously monitor a channel and a beam intensity, by using at least one of the SS/PBCH block and the CSI-RS included in the transmission beam. By using the monitoring operation, the electronic device 101 can adaptively select a beam having a good beam quality. Selectively, when the movement of the electronic device 101 or beam cutoff takes place and thus communication connection is released, the above beam sweeping operation can be again executed to determine a communicatable beam.

Figure 4:
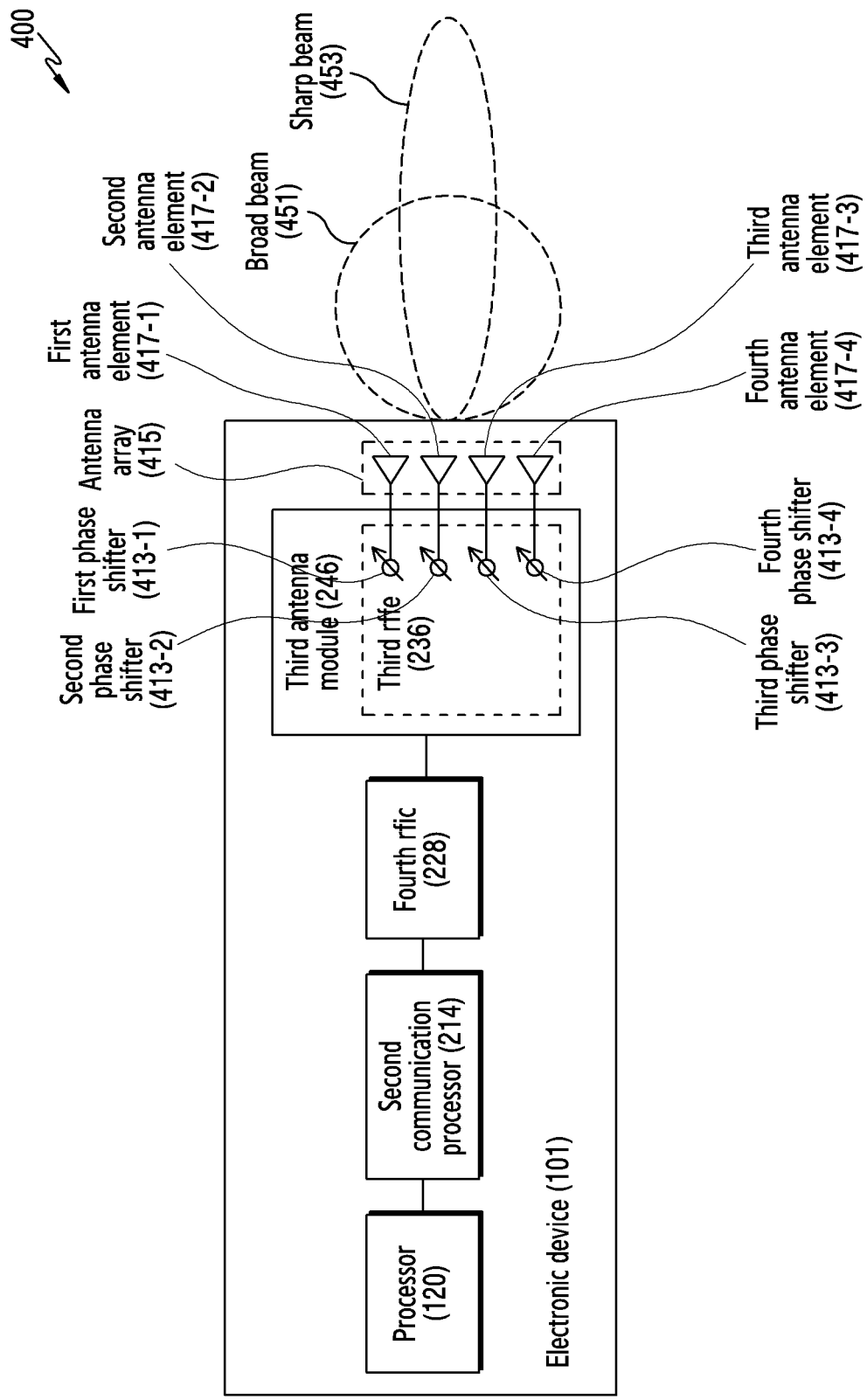
FIG. 4 is a block diagram of an electronic device for 5G network communication according to an embodiment.

FIG. 4 is a block diagram 400 of an electronic device 101 for 5G network communication according to an embodiment. The electronic device 101 can include various components illustrated in FIG. 2, but, for brief description, is illustrated in FIG. 4 to include the processor 120, the second communication processor 214, the fourth RFIC 228, and at least one third antenna module 246.

In an illustrated embodiment, the third antenna module 246 can include first to fourth phase shifters 413-1 to 413-4 (e.g., the phase shifter 238 of FIG. 2) and/or first to fourth antenna elements 417-1 to 417-4 (e.g., the antenna 248 of FIG. 2). Each one of the first to fourth antenna elements 417-1 to 417-4 can be electrically connected to each one of the first to fourth phase shifters 413-1 to 413-4. The first to fourth antenna elements 417-1 to 417-4 can form at least one antenna array 415.

By controlling the first to fourth phase shifters 413-1 to 413-4, the second communication processor 214 can control phases of signals transmitted and/or received through the first to fourth antenna elements 417-1 to 417-4, and can provide a transmission beam and/or a reception beam in a direction selected according to this.

According to an embodiment, the third antenna module 246 can form a broad radiation pattern beam 451 (below, "broad beam") or a sharp radiation pattern beam 452 (below, "sharp beam") mentioned above according to the number of antenna elements used. For example, the third antenna module 246 can form the sharp beam 452 when using all of the first to fourth antenna elements 417-1 to 417-4, and can form the broad beam 451 when using only the first antenna element 417-1 and the second antenna element 417-2. The broad beam 451 has broader coverage than the sharp beam 452, but has a small antenna gain and therefore, can be more effective at beam search. On the other hand, the sharp beam 452 has sharper coverage than the broad beam 451, but has a higher antenna gain and therefore, can enhance communication performance.

According to an embodiment, the second communication processor 214 can use the sensor module 176 (e.g., a 9-axis sensor, a grip sensor, or a GPS) for beam search. For example, by using the sensor module 176, the electronic device 101 can adjust a beam search position and/or a beam search cycle on the basis of a position and/or movement of the electronic device 101. For another example, in response to the electronic device 101 being gripped by a user, the electronic device 101 can select an antenna module having better communication performance among a plurality of third antenna modules 246, by figuring out a user's grip portion by using the grip sensor.

According to various embodiments, an electronic device (e.g., the electronic device 101) can include a housing, at least one antenna array including antenna elements disposed within the housing or formed in a portion of the housing, a processor electrically or operably connected with the antenna array, and configured to form a plurality of reception beams (Rx beams) having mutually different directions by using the antenna array, and a memory operably connected with the at least one processor. The memory can store instructions of, at execution, enabling the at least one processor to form a first beam pair link with a first transmission beam radiated from a first base station by using a first reception beam having a first direction, acquire information about a first time division duplex (TDD) pattern indicating a TDD sequence set in a serving cell formed by the first base station, and information about a second TDD pattern indicating a TDD sequence set in an adjacent cell adjacent to a serving cell formed by a second base station, select a first portion among the first TDD pattern on the basis of the information about the first TDD pattern and the information about the second TDD pattern, obtain whether interference has occurred in the first portion, and form a second beam pair link with one of transmission beams radiated from the second base station by using a second reception beam having a second direction different from the first direction, in response to the interference being determined to have occurred.

According to various embodiments, an electronic device (e.g., the electronic device 101) can include a housing, at least one antenna array including antenna elements disposed within the housing or formed in a portion of the housing, a processor electrically or operably connected with the antenna array, and configured to form a plurality of reception beams (Rx beams) having mutually different directions by using the antenna array, and a memory operably connected with the at least one processor. The memory can store instructions of, at execution, enabling the at least one processor to form a first beam pair link with a first transmission beam radiated from a first base station, acquire information about a first TDD (time division duplex) pattern indicating a TDD sequence set in a serving cell formed by the first base station, and information about a second TDD pattern indicating a TDD sequence set in an adjacent cell adjacent to a serving cell formed by a second base station, select a first portion among the first TDD pattern on the basis of the information about the first TDD pattern and the information about the second TDD pattern, obtain whether interference has occurred in the first portion, and transmit a request for changing into a second BWP different from a first BWP among a plurality of BWPs which is set for the electronic device, to the first base station, in response to the interference being determined to have occurred.

According to various embodiments, the TDD pattern can indicate a sequence for duplex in a plurality of orthogonal frequency division multiplexing (OFDM) symbols, and the duplex can be one of downlink transmission in which data is transmitted from a base station to an electronic device, uplink transmission in which data is transmitted from an electronic device to a base station, and flexible transmission usable as not only the downlink transmission but also the uplink transmission, and the first portion can include at least one OFDM symbol among the plurality of OFDM symbols.

According to various embodiments, the instructions can enable the processor to select, as an interference occurrable duration, an OFDM symbol duration in which duplex by the first TDD pattern is the downlink transmission or the flexible transmission, and duplex by the second TDD pattern is the uplink transmission or the flexible transmission.

According to various embodiments, the instructions can enable the processor to receive a wireless signal on the basis of the first TDD pattern by using the first beam pair link, measure an intensity of the wireless signal in at least a portion among the first portion, and determine that interference has occurred, in response to the measured intensity of the wireless signal being less than a threshold.

According to various embodiments, the instructions can enable to the processor to receive a wireless signal on the basis of the first TDD pattern, by using the first beam pair link, measure an intensity of the wireless signal in at least a portion among the first portion, and determine that interference has occurred, when where the measured intensity of the wireless signal is less than a threshold takes place at least twice or more.

According to various embodiments, the instructions can enable the processor to, after the first portion, again form the first beam pair link by using the first reception beam and the first transmission beam.

According to various embodiments, the instructions can enable the processor to determine a block error rate (BLER) indicating a block error rate of data received within the first portion, and determine that interference has occurred, in response to the BLER being increased more than a specific value, or the BLER being increased by a specific rate or more compared to an average BLER, or the BLER being increased by a specific value or more compared to the average BLER.

According to various embodiments, the instructions enable the processor to select, as the second reception beam, at least one reception beam randomly among a plurality of reception beams providable by the electronic device except the first reception beam, or select, as the second reception beam, a reception beam providable closest to the first reception beam among the plurality of reception beams providable by the electronic device except the first reception beam, or select, as the second reception beam, a reception beam included in a beam pair link having the best wireless signal quality among the plurality of reception beams providable by the electronic device except the first reception beam, on the basis of wireless signal quality information about each previously stored beam pair link.

According to various embodiments, the instructions can enable to the processor to select the second BWP among the plurality of BWPs set for the electronic device except the first BWP, wherein the processor selects a BWP that uses a frequency band position spaced apart most distant from a frequency band position used by the first BWP, or selects a BWP whose bandwidth is least, or measures a wireless signal quality for each of the plurality of BWPs excepting the first BWP, and selects a BWP whose wireless signal quality is best.

According to various embodiments, an electronic device (e.g., the electronic device 101 or the electronic device 102) can include antenna modules 242, 244 and 246 capable of forming a plurality of transmission beams and/or a plurality of reception beams and at least one processor 120, 121, 123, 212 or 214 controlling the antenna module. The at least one processor can be configured to recognize an interference occurrable duration, and obtain whether interference has occurred in the interference occurrable duration, and in response to determining that the interference has occurred, change a reception beam or bandwidth part (BWP) used in the electronic device. Changing the reception beam or BWP used in the electronic device can include at least one of adjusting the reception beam, or requesting BWP change, or changing the setting of a beam pair a transmission beam of a base station and a reception beam of the electronic device, or requesting BWP resetting.

According to various embodiments, the at least one processor can be configured to recognize the interference occurrable duration on the basis of at least one of a time division duplex (TDD) pattern set in the electronic device, a TDD pattern set in a serving cell, or a TDD pattern set in an adjacent cell.

According to various embodiments, the at least one processor can be configured to recognize, as the interference occurrable duration, a time duration in which the serving cell is a downlink duration where data is transmitted from a base station to an electronic device and the adjacent cell is an uplink duration where data is transmitted from an electronic device to a base station, or a time duration in which the serving cell is a downlink duration where data is transmitted from a base station to an electronic device and the adjacent cell is a flexible duration which can be used for downlink transmission or uplink transmission.

According to various embodiments, the at least one processor can be configured to recognize the interference occurrable duration on the basis of all TDD patterns set in a plurality of adjacent cells, or recognize the interference occurrable duration on the basis of only a TDD pattern set in an adjacent cell in which a measured wireless signal quality is equal to or is greater than a threshold among the plurality of adjacent cells, or recognize the interference occurrable duration on the basis of only a TDD pattern set in an N number of adjacent cells in order in which the measured wireless signal quality is high among the plurality of adjacent cells, or recognize the interference occurrable duration on the basis of only a TDD pattern set in an adjacent cell in which the measured wireless signal quality is highest among the plurality of adjacent cells.

According to various embodiments, the at least one processor can be configured to, in response to failing to acquire the TDD pattern set in the adjacent cell, recognize the entire downlink duration of a TDD pattern set in the serving cell as the interference occurrable duration.

According to various embodiments, the at least one processor can be configured to receive a reference signal set each outside the interference occurrable duration and within the interference occurrable duration, and measure a wireless signal quality outside the interference occurrable duration and within the interference occurrable duration by using the reference signal, and determine that interference has occurred, in response to a wireless signal quality measured within the interference occurrable duration has been deteriorated by a specific value or more or a specific rate or more compared to a wireless signal quality measured outside the interference occurrable duration.

According to various embodiments, the at least one processor can be configured to receive a reference signal set within the interference occurrable duration, and measure a wireless signal quality by using the received reference signal, and estimate an average of the wireless signal quality measurement value, and determine that interference has occurred, in response to the measured wireless signal quality has been deteriorated more than the estimated average value by a specific value or more or a specific rate or more.

According to various embodiments, the at least one processor can be configured to determine a block error rate (BLER) indicating a block error rate of data received within the interference occurrable duration, and determine that interference has occurred, in response to the BLER being increased more than a specific value, or the BLER being increased by a specific rate or more compared to an average BLER, or the BLER being increased by a specific value or more compared to the average BLER.

According to various embodiments, the at least one processor can be configured to select at least one reception beam among the remnant reception beams excepting a reception beam which is being currently used among a plurality of reception beams formable by the electronic device for the sake of the reception beam adjustment, and measure a wireless signal quality for the selected at least one reception beam, and adjust to receive downlink transmission by using the selected at least one reception beam in response to the measured wireless signal quality being greater than a previously set threshold, and again select at least one reception beam in response to the measured wireless signal quality being less than the previously set threshold.

According to various embodiments, the at least one processor can be configured to select at least one reception beam randomly among the remnant reception beams excepting a reception beam which is being currently used among a plurality of reception beams formable by the electronic device, or select a reception beam which can be formed closest to the reception beam which is being currently used among the remnant reception beams excepting the reception beam which is being currently used among the plurality of reception beams formable by the electronic device, or select a reception beam on the basis of wireless signal quality information about each beam pair of a base station transmission beam and an electronic device reception beam previously stored among the remnant reception beams excepting the reception beam which is being currently used among the plurality of reception beams formable by the electronic device.

According to various embodiments, the at least one processor can be configured to change the setting of the beam pair of the base station transmission beam and the electronic device reception beam, in response to the measured wireless signal quality being less than the previously set threshold for all the remnant reception beams excepting the reception beam which is being currently used among the plurality of reception beams formable by the electronic device.

According to various embodiments, the at least one processor can be configured to determine whether interference has occurred and adjust the original reception beam into a new reception beam, and in response to escaping the interference occurrable duration, adjust to again use the original reception beam.

According to various embodiments, the at least one processor can be configured to determine whether continuous interference has occurred, and in response to determining that the continuous interference does not have occurred, adjust a reception beam, and in response to determining that the continuous interference has occurred, perform reception beam adjustment iteratively at each interference, or request the BWP change, or change the setting of the beam pair of the base station transmission beam and the electronic device reception beam or request the BWP resetting.

According to various embodiments, the at least one processor can be configured to select a BWP which will be activated among at least one non-activated BWP in order to request the BWP change, and request to activate the selected BWP to the base station.

According to various embodiments, the at least one processor can be configured to select a BWP in which a frequency band position is spaced apart most distant from a currently activated BWP in order to select the BWP which will be activated, or select a BWP whose bandwidth is least, or measure a wireless signal quality measured for the non-activated BWP and select a BWP whose wireless signal quality is best.

According to various embodiments, the at least one processor can be configured to transmit one of a scheduling request (SR) signal of requesting to allocate the selected BWP a resource for uplink transmission to the base station, a wireless signal quality for a plurality of BWPs, or a sound reference signal (SRS) through set all BWPs.

Figure 5:
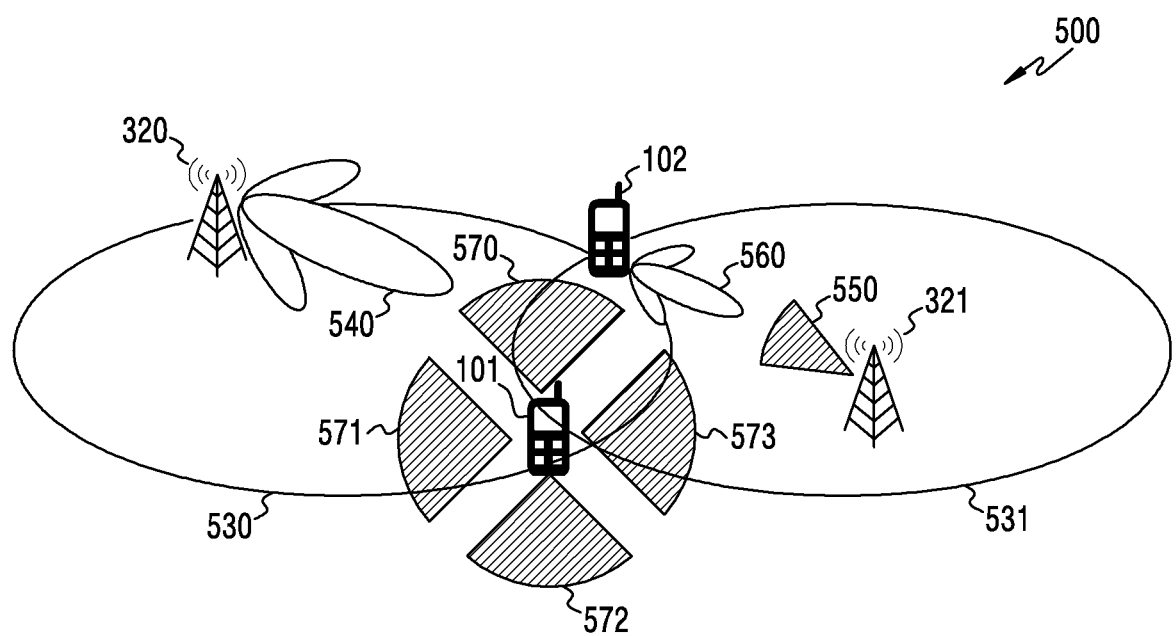
FIG. 5 is a diagram exemplifying transmitting data between a base station and an electronic device in a dynamic time division duplex (TDD) environment.

FIG. 5 is a diagram 500 exemplifying transmitting data between a base station 320 or 321 and an electronic device 101 or 102 in a dynamic TDD environment.

In FIG. 5, the first base station 320 and the second base station 321 each can correspond to the base station 320 of FIG. 3, and the first electronic device 101 and the second electronic device 102 each can correspond to the electronic device 101 of FIG. 1 to FIG. 3. Referring to FIG. 5, the first base station 320 can form a first cell 530 which is a region where data transmission and reception with the first electronic device 101 are possible, and perform data communication with the first electronic device 101 within the first cell 530. The second base station 321 can form a second cell 531 which is a region where data transmission and reception with the second electronic device 102 are possible, and perform data communication with the second electronic device 102 within the second cell 531. The data transmission from the electronic device 101 or 102 to the base station 320 or 321 can be called uplink transmission, and the data transmission from the base station 320 or 321 to the electronic device 101 or 102 can be called downlink transmission. And, a cell formed by a base station to which the electronic device 101 or 102 performs the data transmission can be called a serving cell, and a cell formed by another base station around the serving cell can be called an adjacent cell. In an example, in the first base station 320, the first cell 530 can be a serving cell, and the second cell 531 can be an adjacent cell. In the second base station 321, the second cell 531 can be a serving cell, and the first cell 530 can be an adjacent cell.

According to various embodiments, the base station 320 or 321 and the electronic device 101 or 102 can use a beam provided by beamforming for data transmission. For example, the base station 320 or 321 and the electronic device 101 or 102 can form a plurality of transmission beams 540 and 560 and a plurality of reception beams 550, 570, 571, 572, and 573 having mutually different radiation directions for data transmission. In accordance with an embodiment, for the sake of uplink transmission, the base station 320 or 321 and the electronic device 101 or 102 can select one transmission beam among a formable plurality of transmission beams of the electronic device and one reception beam among a formable plurality of reception beams of the base station, to determine a beam pair. Also, for the sake of downlink transmission, the base station 320 or 321 and the electronic device 101 or 102 can select one transmission beam among a formable plurality of transmission beams of the base station 320 or 321 and one reception beam among a formable plurality of reception beams of the electronic device 101 or 102, to determine a beam pair. The beam pair is not limited to this, and can include one or more transmission beams and at least one or more reception beams as well.

According to various embodiments, the electronic device 101 or 102 and the base station 320 or 321 can form a communication link by using a selected beam pair. Forming the communication link by the beam pair of the transmission beam and the reception beam between the electronic device 101 or 102 and the base station 320 or 321 can be called a beam pair link. The electronic device 101 or 102 and the base station 320 or 321 can perform uplink and/or downlink transmission on the basis of the beam pair link. For example, the electronic device and the base station can transmit or receive at least one of a control message or data through the beam pair link. Also, the electronic device 101 or 102 and the base station 320 or 321 can perform uplink and/or downlink transmission on the basis of at least one or more beam pair links.

In an embodiment of FIG. 5, the first base station 320 and the first electronic device 101 can perform downlink transmission by using a beam pair of the transmission beam 540 of the first base station 320 and the reception beam 570 of the first electronic device 101. At this time, as mentioned above, the first electronic device 101 can determine one reception beam 570 among the plurality of reception beams 570, 571, 572, and 573, as a reception beam for downlink transmission, through the sweeping operation. The second base station 321 and the second electronic device 102 can perform uplink transmission by using a beam pair of the transmission beam 560 of the second electronic device 102 and the reception beam 550 of the second base station 321. Even in this case, the second base station 321 and the second electronic device 102 can determine to perform the uplink transmission by using the beam pair of the one transmission beam 560 among a plurality of transmission beams and the one reception beam 550 among a plurality of reception beams. In the above-described one embodiment, the data transmission by the beam pair of the one transmission beam/reception beam has been exemplified, but, in accordance with other embodiments, data transmission using two or more beam pairs, data transmission by a beam pair consisting of one transmission beam and a plurality of reception beams, data transmission by a beam pair consisting of a plurality of transmission beams and one reception beam, and data transmission by a beam pair consisting of a plurality of transmission beams and a plurality of reception beams are also possible.

In an embodiment, a dynamic TDD scheme proposed in 5G new radio (NR) can change duplex more flexibly than an LTE TDD scheme. The dynamic TDD scheme can use an OFDM symbol, not a subframe, as the unit of duplex change, and set a TDD pattern every scheduling cycle by each electronic device, by using information related to a slot form transmitted by a base station as well.

In an embodiment, inter-cell interference can occur, when the same frequency band is used between adjacent cells, and the first electronic device 101 is in a downlink transmission state and the second electronic device 102 of an adjacent cell (e.g., the second cell 531 of FIG. 5) is in an uplink transmission state. For example, downlink reception of the first electronic device 101 within the first cell 530 can suffer the influence of interference by uplink transmission of the second electronic device 102 of the adjacent cell. Because an omnidirectional antenna or omnidirectional beam is used at a band of 6 GHz or less, the influence of inter-cell interference can be large. Because a beamforming technology is used at the band of 6 GHz or more, the influence of interference can occur, when the direction of the transmission beam 560 of the second electronic device 102 and the direction of the reception beam 570 of the first electronic device 101 are overlapped in part. However, because a possibility of overlapping is decreased as a sharp beam width is used, even a possibility of exerting influence can be decreased. However, even though a main lobe of a beam is not overlapped, a side lobe provided upon beamforming can induce inter-cell interference. In one embodiment, a width of the provided side lobe can be about 60 degrees even in case of a pencil beam of a sharp beam width which can be formed through a 4×4 array antenna, and can be about 120 degrees in case of a fan beam which can be formed through a 1×4 array antenna. Therefore, even though the beamforming technology is used at the band of 6 GHz or more, an inter-cell interference phenomenon can take place.

In an embodiment, inter-cell interference can occur, when a reference electronic device (e.g., the first electronic device 101) and an electronic device (e.g., the second electronic device 102) of an adjacent cell are scheduled to a resource of the same position at the same time. However, even when the reference electronic device and the electronic device of the adjacent cell are scheduled to resources of different positions, interference can occur due to the breakage of signal orthogonality in a fast Fourier transform (FFT) transform operation. Particularly, at the band of 6 GHz or more, owing to a high frequency characteristic, an RF front end of a transmission end transmits only a band signal of a scheduled resource, and it is difficult to use a filter for deletion for the remnant band signal and as a result, an adjacent channel leakage ratio (ACLR) characteristic can be deteriorated. For example, electric energy leaked into an adjacent channel can increase and, owing to this, interference can occur when they are not scheduled to the resource of the same position.

Various embodiments of the present disclosure propose a method for mitigating and/or avoiding inter-cell interference by an electronic device in a dynamic TDD environment.

Figure 6:
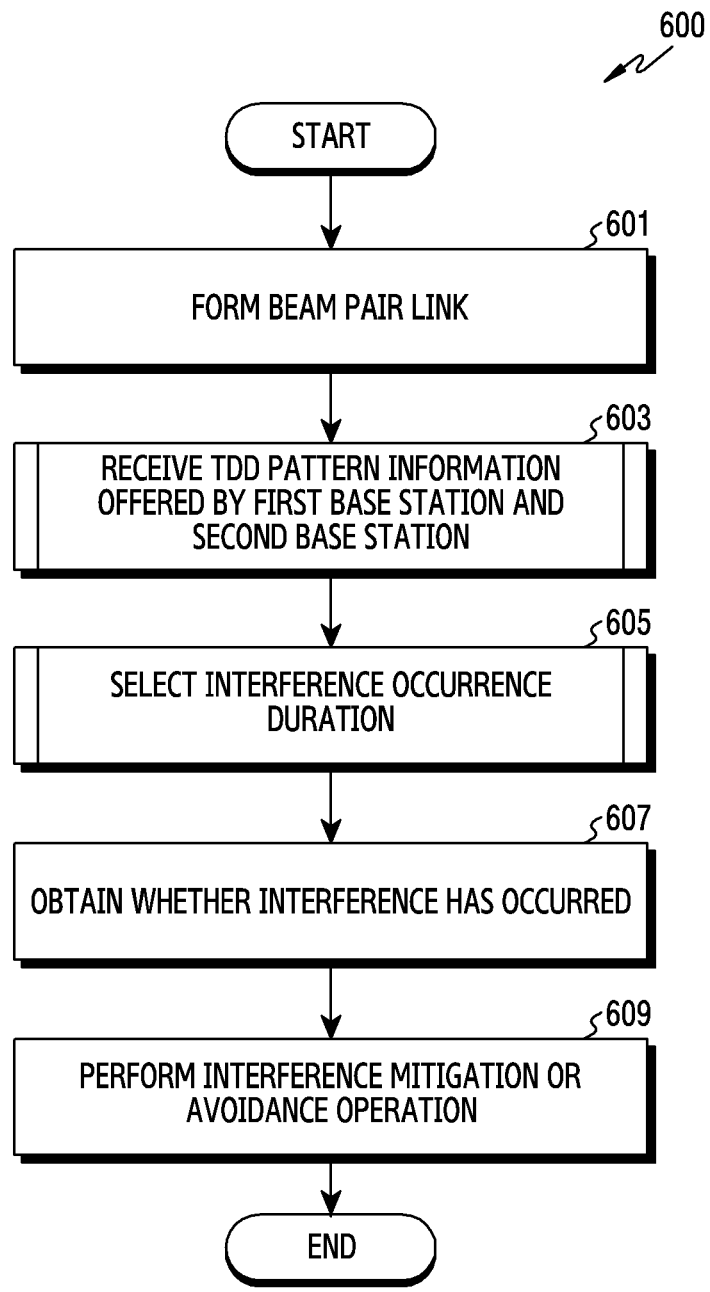
FIG. 6 is a flowchart illustrating an operation of a first electronic device for mitigating inter-cell interference according to various embodiments.
Figure 7:
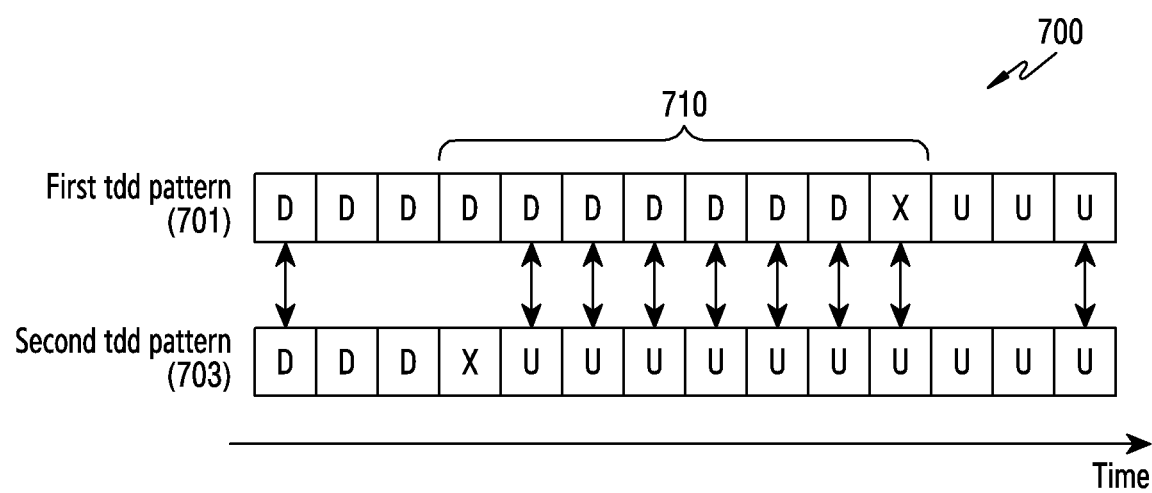
FIG. 7 is a diagram illustrating TDD patterns set to a first electronic device and a second electronic device capable of providing inter-cell interference according to an embodiment.

FIG. 6 is a flowchart 600 illustrating an operation of the first electronic device 101 for mitigating inter-cell interference according to various embodiments. FIG. 7 is a diagram 700 illustrating TDD patterns set to the first electronic device 101 and the second electronic device 102 capable of providing inter-cell interference according to an embodiment. An operation subject of the flowchart 600 exemplified in FIG. 6 can be understood as the electronic device 101 of FIG. 1 or a component (e.g., the processor 120 of FIG. 1) of the electronic device 101.

According to various embodiments, in operation 601, the first electronic device 101 (e.g., the processor 120) can form a beam pair link for downlink transmission. As illustrated in FIG. 3, a beam pair of a transmission beam of the first base station 320 and a reception beam of the first electronic device 101 for downlink transmission can be determined through a sweeping operation, and the determined beam pair can be used to form a beam pair link that is a communication link for downlink transmission. Even for a beam pair link for uplink transmission, a transmission beam of the first electronic device 101 and a reception beam of the first base station 320 can be determined through the same sweeping operation, to form the beam pair link for uplink transmission, or the transmission beam of the first base station 320 and the reception beam of the first electronic device 101 determined for downlink transmission can be converted into a reception beam of the first base station 320 and a transmission beam of the first electronic device 101, respectively, to form the beam pair link for uplink transmission. The first electronic device 101 can perform the downlink transmission and the uplink transmission by using the formed beam pair link, to receive data from the first base station 320 or transmit data to the first base station 320.

According to various embodiments, in operation 603, the first electronic device 101 can receive information about a first TDD pattern 701 and a second TDD pattern 703 indicating a TDD sequence set in each cell, from the first base station 320 forming a serving cell (e.g., the first cell 530 of FIG. 5) and the second base station 321 forming an adjacent cell (e.g., the second cell 531 of FIG. 5). Here, the first TDD pattern 701 can be an electronic device—specific TDD pattern which is set for the first electronic device 101, or a cell—specific TDD pattern which is set for all electronic devices within the first cell 530. And, the second TDD pattern 702 can be a cell-specific TDD pattern which is set for all electronic devices within the second cell 531.

Because the 5G NR standard defined in 3GPP allows to set and change a TDD pattern dynamically by cell and by electronic device, the first electronic device 101 may be difficult to perfectly acquire TDD pattern setting information about a specific electronic device (e.g., the second electronic device 102 of FIG. 5) within the second cell 531. However, the first electronic device 101 can acquire TDD pattern setting information for the second cell 531. In an embodiment, the first electronic device 101 can acquire second TDD pattern 703 setting information from the first base station 320. In this case, the second TDD pattern 703 setting information can be forwarded from the second base station 321 to the first base station 320. In another embodiment, the first electronic device 101 can acquire cell-specific TDD pattern setting information set to the second cell 531, from at least one system information (e.g., minimum system information (MSI), remaining MSI (RMSI), system information (SI), a master information block (MIB) or a system information block (SIB)) transmitted by the second base station 321, which is acquired during the execution of an operation of measuring a quality of a wireless signal coming from the second base station 321.

According to various embodiments, in operation 605, the first electronic device 101 can select an interference occurrable duration among the first TDD pattern 701 on the basis of information about the first TDD pattern 701 and the second TDD pattern 703 received from the first base station 320 and the second base station 321. Here, the interference occurrable duration can mean a region where interference may occur in a frame or a subframe, and be called an 'interference possible portion', an 'interference possible region', a 'first region', a 'first portion', etc. Accordingly, the first portion can be called an interference occurrable duration. For example, referring to FIG. 7, the TDD pattern can represent a sequence for duplex in a plurality of OFDM symbols. The 'D' written in each OFDM symbol can represent a downlink duration where downlink transmission from a base station to an electronic device can be performed, and the II can represent an uplink duration where uplink transmission from the electronic device to the base station can be performed, and the 'X' can represent a flexible duration (or unknown duration) where downlink transmission and/or uplink transmission can be performed. As illustrated in FIG. 7, the first electronic device 101 can be interfered by the transmission beam 560 that the second electronic device 102 radiates during a time duration 710 corresponding to a downlink duration or flexible duration of the first TDD pattern 701 set for the first electronic device 101 and an uplink duration or flexible duration of the second TDD pattern 703 set for the second electronic device 102. Accordingly to this, the first electronic device 101 can select the time duration 710 as the interference occurrable duration.

According to various embodiments, the first electronic device 101 can acquire TDD pattern setting information about a plurality of adjacent cells. At this time, the first electronic device 100 can select an interference occurrable duration on the basis of all acquired TDD pattern setting information about the plurality of adjacent cells or on the basis of TDD pattern setting information about some adjacent cells among the plurality of adjacent cells. In an embodiment, the first electronic device 101 can select the interference occurrable duration on the basis of only TDD pattern setting information about an adjacent cell in which a measured quality of a wireless signal transmitted from a base station of the adjacent cell is equal to or is greater than a previously set threshold. In another embodiment, the first electronic device 101 can select the interference occurrable duration on the basis of only TDD pattern setting information about an N number of adjacent cells in order in which measured qualities of wireless signals transmitted from base stations of the adjacent cells are high. In another embodiment, the first electronic device 101 can select the interference occurrable duration on the basis of only TDD pattern setting information about one adjacent cell in which a measured quality of a wireless signal transmitted from a base station of the adjacent cell is highest. In a further embodiment, in response to failing to acquire the TDD pattern setting information about the adjacent cell, the first electronic device 101 can select the entire downlink duration and flexible duration of the first TDD pattern 701, as the interference occurrable duration as well.

In an embodiment, the first electronic device 101 can monitor a quality of a wireless signal by using reference signals such as, for example, a channel state indicator-reference signal (CSI-RS) and/or a synchronization signal block (SSB) transmitted by the base station. At this time, the measurement value can be a signal to interference and noise ratio (SINR) or one capable of offering equivalent information.

According to various embodiments, in operation 607, the first electronic device 101 can obtain whether interference has occurred in the selected interference occurrable duration. By monitoring a quality of a wireless link in the selected interference occurrable duration, the first electronic device 101 can obtain whether inter-cell interference has occurred. According to various embodiments, the first electronic device 101 can determine whether the interference has occurred, by using a wireless signal (e.g., a reference signal, a data signal, etc.) received from the first base station 320. According to an embodiment, the first electronic device 101 can determine whether the interference has occurred, by measuring an intensity of a wireless signal received using a first beam pair link formed for current downlink transmission in at least a partial duration of the selected interference occurrable duration 710 among the first TDD pattern 701.

Figure 8:
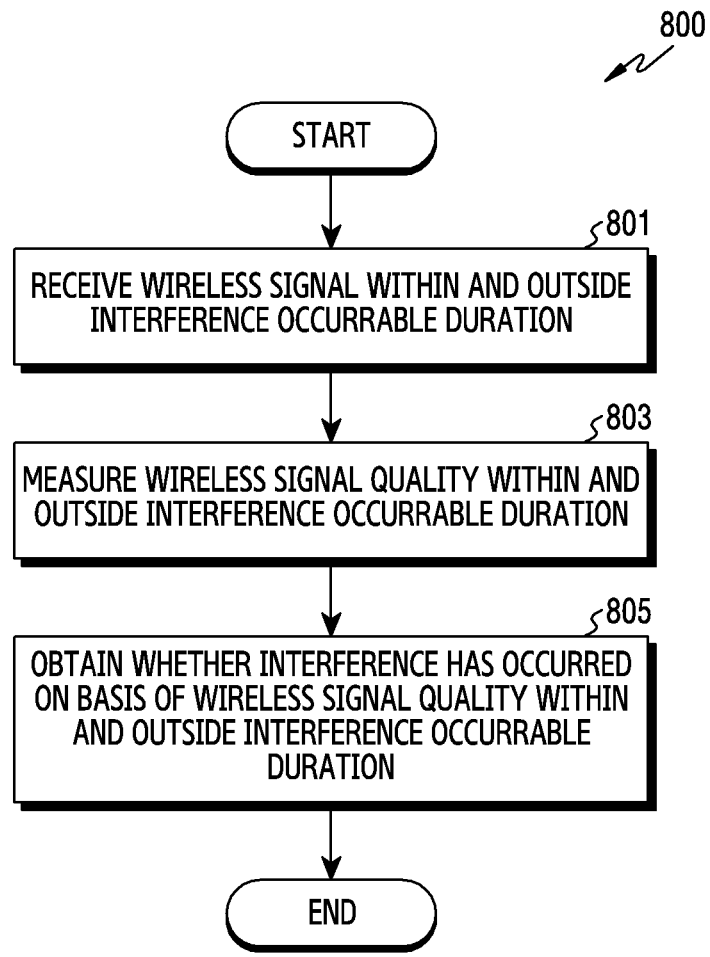
FIG. 8 is a flowchart illustrating an operation of obtaining whether interference has occurred in a first electronic device according to an embodiment.

FIG. 8 is a flowchart 800 illustrating an operation of obtaining whether interference has occurred in the first electronic device 101 according to an embodiment. The flowchart 800 exemplified in FIG. 8 is an embodiment of operation 607 of FIG. 6, and an operation subject can be understood as an electronic device (e.g., the electronic device 101 of FIG. 1) or a component (e.g., the processor 120 of FIG. 1) of the electronic device 101.

According to various embodiments, in operation 801, the first electronic device 101 (e.g., the processor 120) can receive a reference signal within or outside an interference occurrable duration. The first base station 320 can transmit a reference signal in all durations irrespective of within or outside the interference occurrable duration. For example, the first electronic device 101 can receive at least one reference signal through reference signal resources configured by the first base station 320. The reference signal can include at least one of a cell specific reference signal (CRS), a CSI-RS, and CSI-interference mitigation (IM).

According to various embodiments, in operation 803, the first electronic device 101 can measure a quality of a wireless signal transmitted from the first base station 320 within or outside the interference occurrable duration by using the received reference signal. The first electronic device 110 can measure the quality of the wireless signal in a time duration within the interference occurrable duration and the quality of the wireless signal in a time duration outside the interference occurrable duration, separately. The quality of the wireless signal can be indicated by at least one of reference signal received power (RSRP), a reference signal received quality (RSRQ), a signal to noise and interference ratio (SINR), and a signal to noise ratio (SNR).

According to various embodiments, in operation 805, the first electronic device 101 can obtain whether interference has occurred on the basis of the quality of the wireless signal within or outside the interference occurrable duration. In accordance with an embodiment, the first electronic device 101 can determine that inter-cell interference has occurred, when a quality measurement value of the wireless signal measured within the interference occurrable duration has been deteriorated by a specific value or more or a specific rate or more compared to a quality measurement value of the wireless signal measured outside the interference occurrable duration.

In an embodiment described with reference to FIG. 8, the first electronic device 101 can obtain interference by using a reference signal received within the interference occurrable duration and a reference signal received outside the interference occurrable duration. In accordance with another embodiment, the first electronic device 101 can obtain whether inter-cell interference has occurred by using only a reference signal which is set within the interference occurrable duration. An embodiment of obtaining whether the inter-cell interference has occurred by using only the reference signal set within the interference occurrable duration is described below with reference to FIG. 9.

Figure 9:
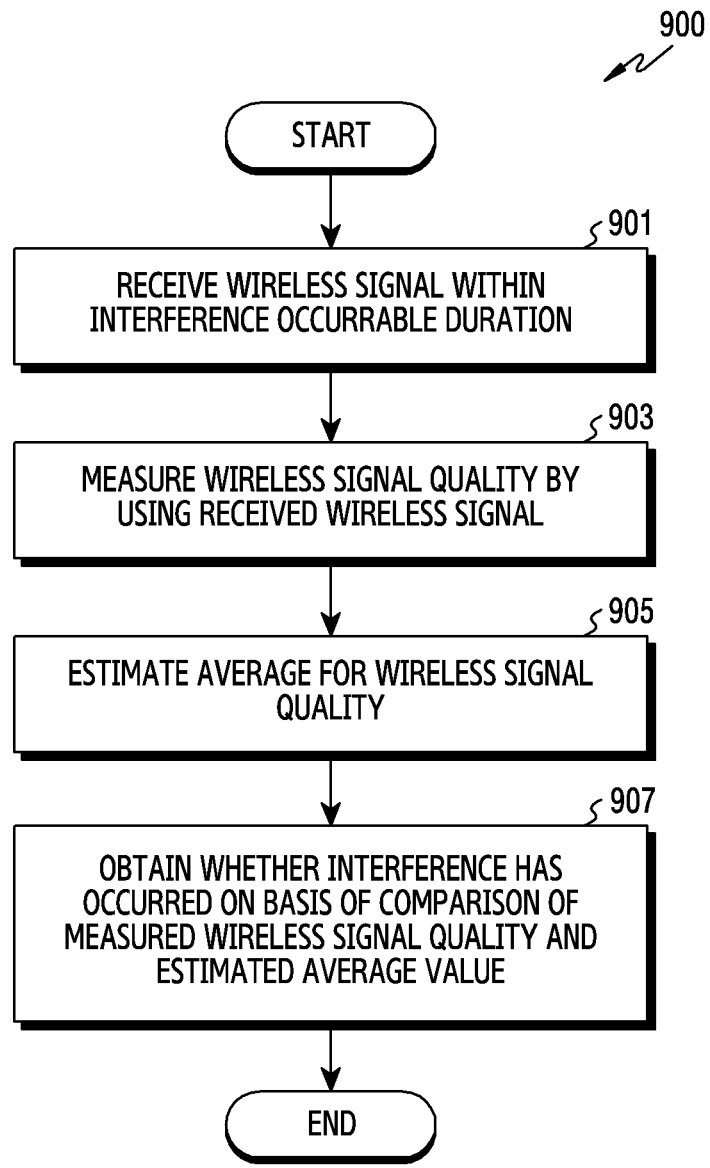
FIG. 9 is a flowchart illustrating an operation of obtaining whether interference has occurred in a first electronic device according to another embodiment.

FIG. 9 is a flowchart 900 illustrating an operation of obtaining whether interference has occurred in the first electronic device 101 according to an embodiment. The flowchart 900 exemplified in FIG. 9 is an embodiment of operation 607 of FIG. 6, and an operation subject can be understood as an electronic device (e.g., the electronic device 101 of FIG. 1) or a component (e.g., the processor 120 of FIG. 1) of the electronic device 101.

According to various embodiments, in operation 901, the first electronic device 101 (e.g., the processor 120) can receive a reference signal transmitted from the first base station 320 within an interference occurrable duration. The reference signal can be configured for the purpose of obtaining whether interference has occurred, or be configured for other purposes.

According to various embodiments, in operation 903, the first electronic device 101 can measure a quality of a wireless signal within the interference occurrable duration by using the received reference signal. The quality of the wireless signal can be indicated by at least one of an RSRP, an RSRQ, an SINR, and an SNR. The first electronic device 101 can measure the quality of the wireless signal for at least one beam pair link which is being currently used for data reception. Additionally, the first electronic device 101 can measure a quality of a wireless signal for another beam pair link other than at least one beam pair link which is being currently used for data reception. In this case, the quality of the wireless signal for another beam pair link can be utilized later in an operation of changing a reception beam of the first electronic device 101.

According to various embodiments, in operation 905, the first electronic device 101 can estimate an accumulated average of the measured values, or an average during a specified time. For example, an average operation can be performed for a plurality of slots within one interference occurrable duration, or for a plurality of interference occurrable durations. The estimated average value can be stored in a storage device (e.g., the memory 130 of FIG. 1).

According to various embodiments, in operation 907, the first electronic device 101 can obtain whether interference has occurred on the basis of a result of comparing the measured quality of the wireless signal and the estimated average value. In an embodiment, the first electronic device 101 can determine that inter-cell interference has occurred, when the measured quality of the wireless signal has been deteriorated by a specific value or more, greater than the estimated average value, or has been deteriorated by a specific rate or more.

According to another embodiment, in response to the first electronic device 101 receiving downlink transmission data in the interference occurrable duration, the first electronic device 101 can obtain inter-cell interference by using a block error rate (BLER) indicating an error rate of a transmitted data block. Below, an embodiment capable of determining whether inter-cell interference has occurred without measurement on a wireless signal quality is described.

Figure 10:
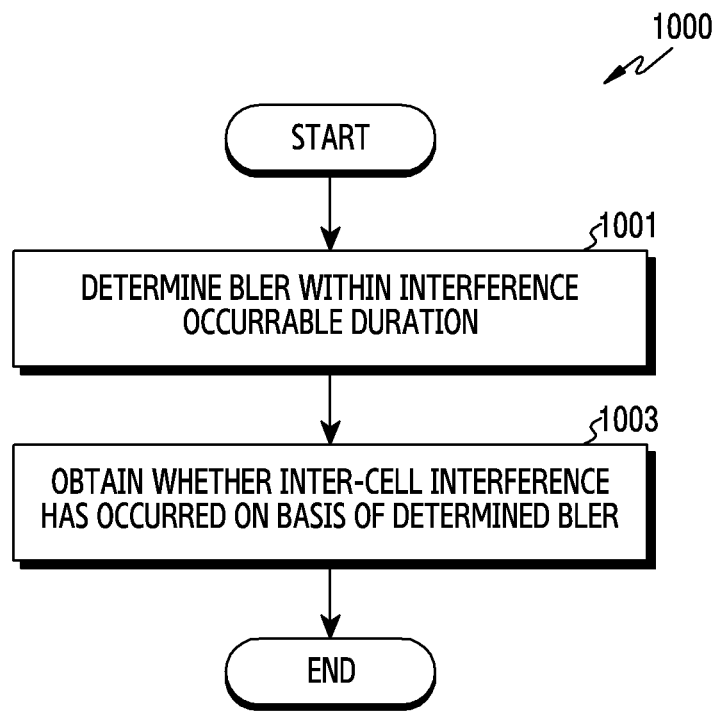
FIG. 10 is a flowchart illustrating an operation of obtaining whether interference has occurred in a first electronic device according to a further embodiment.

FIG. 10 is a flowchart 1000 illustrating an operation of obtaining whether interference has occurred in the first electronic device 101 according to another embodiment. The flowchart 1000 exemplified in FIG. 10 is an embodiment of operation 607 of FIG. 6, and an operation subject can be understood as an electronic device (e.g., the electronic device 101 of FIG. 1) or a component (e.g., the processor 120 of FIG. 1) of the electronic device 101.

According to various embodiments, in operation 1001, the first electronic device 101 (e.g., the processor 120) can determine a BLER in an interference occurrable duration. The first electronic device 101 can update BLER determination whenever each data block is received.

According to various embodiments, in operation 1003, the first electronic device 101 can obtain whether inter-cell interference has occurred on the basis of the determined BLER. In an embodiment, the first electronic device 101 can determine that the inter-cell interference has occurred, in response to the BLER being a specific value or more, or being increased by a specific rate or more compared to an average BLER or being increased by a specific value or more. Additionally, in response to determining that an event on the above-described BLER has occurred, the first electronic device 101 can measure a quality of a wireless signal by using a reference signal between transmitted data, and compare the measured quality of the wireless signal with a previously measured wireless signal quality or an average of the measured wireless signal quality and thereafter, on the basis of a result thereof, determine that the inter-cell interference has occurred. In another embodiment, the first electronic device 101 has obtained a wireless signal quality on the basis of a reference signal, so the first electronic device 101 can estimate an intensity of an interference signal and, in response to the intensity of the interference signal being equal to or being greater than a threshold, the first electronic device 101 can determine that the inter-cell interference has occurred.

According to various embodiments, in response to interference occurrence being obtained (or in response to determining that interference has occurred), in operation 609, the first electronic device 101 can perform an interference mitigation or avoidance operation. The interference mitigation or avoidance operation can include at least one operation among an operation of adjusting a reception beam, an operation of requesting BWP change, an operation for changing the setting of a pair of a transmission beam of the base station/a reception beam of the electronic device, and an operation of requesting BWP resetting.

The 5G NR standard has defined to use an ultra broadband frequency reaching a maximum 400 MHz. Accordingly to this, by the need for various electronic devices to efficiently divide and use an ultra broadband frequency resource, the 5G NR standard has introduced a BWP concept. BWP can previously set a frequency band, etc. that a 5G electronic device can use. In an initial access process, capability information of an electronic device including a supportable RF bandwidth, etc. is transmitted to a base station and, on the basis of this capability information, the base station can set a BWP that each electronic device will use. The base station sets a BWP to the electronic device, whereby the electronic device can use only a frequency band set by the BWP, in performing data communication with the base station. The base station can set a plurality of BWPs to one electronic device and, at this time, frequency bands allocated to respective BWPs can be mutually overlapped or not, but the electronic device can use at least one BWP at one time point.

According to various embodiments, the first electronic device 101 can mitigate or avoid inter-cell interference, by adjusting a beam pair link which is being currently used for downlink transmission into another beam pair link.

Figure 11:
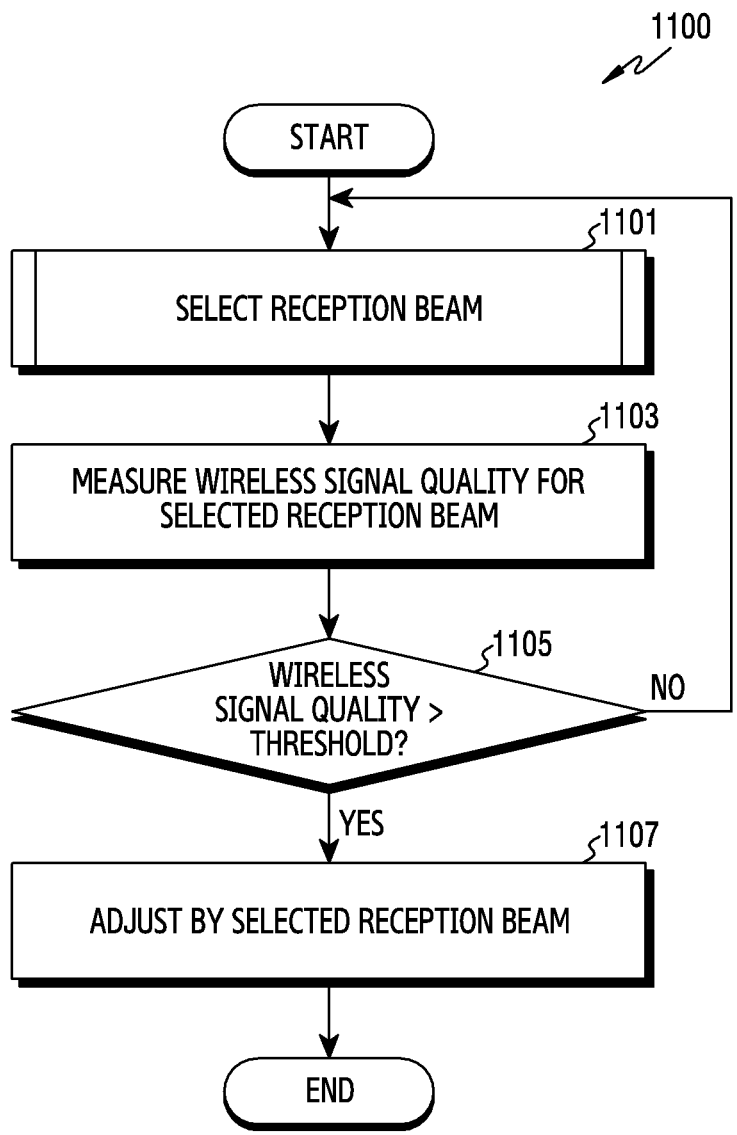
FIG. 11 is a flowchart illustrating an operation of mitigating or avoiding inter-cell interference by a first electronic device according to an embodiment.

FIG. 11 is a flowchart 1100 illustrating an operation of mitigating or avoiding inter-cell interference in the first electronic device 101 according to an embodiment. The flowchart 1100 exemplified in FIG. 11 is an embodiment of operation 609 of FIG. 6, and an operation subject can be understood as an electronic device (e.g., the electronic device 101 of FIG. 1) or a component (e.g., the processor 120 of FIG. 1) of the electronic device 101.

According to various embodiments, in operation 1101, the first electronic device 101 (e.g., the processor 120) can select at least one reception beam excepting a reception beam which is being currently used among a formable plurality of reception beams. In accordance with various embodiments, the at least one reception beam can be selected based on at least one of relationship (e.g., a proximity and an independency) between reception beams, a previously acquired beam quality measurement result, and an identity of a transmission beam forming a pair. In accordance with another embodiment, the at least one reception beam can be selected randomly or unintentionally. Various embodiments of selecting are described later in a little more detail.

According to various embodiments, in operation 1103, the first electronic device 101 can form a new beam pair link by using the selected at least one reception beam, and measure a quality of a wireless signal by using a reference signal received from the first base station 320 through the newly formed beam pair link. In another embodiment, the first electronic device 101 can measure the quality of the wireless signal by using a synchronization signal instead of the reference signal or by using a demodulation reference signal (DMRS) received together with a broadcasting signal.

According to various embodiments, in operation 1105, the first electronic device 101 can compare the measured quality of the wireless signal with a previously set threshold. In response to the measured quality of the wireless signal being greater than the threshold, in operation 1107, the first electronic device 101 can adjust to receive downlink transmission through the new beam pair link which is formed using the selected at least one reception beam. In response to the measured quality of the wireless signal being less than the threshold, the first electronic device 101 can return to operation 1101 and again select another reception beam.

According to various embodiments, a method in which the first electronic device 101, in operation 1101, selects the at least one reception beam among the remnant reception beams excepting the reception beam which is being currently used among the formable plurality of reception beams can be various. In an embodiment, the first electronic device 101 can unintentionally select at least one reception beam among the remnant reception beams excepting the reception beam which is being currently used among the formable plurality of reception beams. In another embodiment, the electronic device 101 can select a reception beam which can be formed closest to the reception beam which is being currently used among the remnant reception beams excepting the reception beam which is being currently used among the formable plurality of reception beams. To select the reception beam which can be formed closest to the reception beam which is being currently used, the electronic device 101 can use an angle between the reception beam which is being currently used and the reception beam which will be selected. This is because there is a possibility in which a quality of a wireless signal is similar in response to being formed closest to the reception beam which is being currently used. On the other hand, even a possibility in which such selected reception beam induces inter-cell interference is high. In this case, because a direction or position of a formable reception beam has been previously determined, the first electronic device 101 can previously determine the order of selection, and select a reception beam according to this order.

In another embodiment, the electronic device 101 can select a reception beam on the basis of previously stored wireless signal quality information about each beam pair of a first base station 320 transmission beam and a first electronic device 101 reception beam among the remnant reception beams excepting a reception beam which is being currently used among a formable plurality of reception beams. The first electronic device 101 can form a plurality of reception beams by using beamforming and, in course of an initial access or in response to a specific event occurring, can determine a beam pair of a base station transmission beam which will be used for data transmission and an electronic device reception beam, through a sweeping operation, to form a plurality of beam pair links. At this time, the first electronic device 101 can determine, as a reception beam for downlink transmission, a reception beam of a beam pair link whose wireless signal quality is best among beam pair links in which a wireless signal quality measured using a reference signal received through each beam pair link is equal to or is greater than a specific threshold. The first electronic device 101 can measure a wireless signal quality, by using a reference signal received through a beam pair link formed by a beam pair of each base station transmission beam and electronic device reception beam in an operation of determining a beam pair of a base station transmission beam and an electronic device reception beam for downlink transmission, and store the same in a storage device. In response to determining that the inter-cell interference has occurred, the first electronic device 101 can select a reception beam on the basis of the wireless signal quality information for each beam pair link stored in the storage device. In an embodiment, the first electronic device 101 can select a reception beam of the first electronic device 101 included in a beam pair link whose wireless signal quality is best among other beam pair links including a transmission beam being the same as a transmission beam of the first base station 320 included in a beam pair link which is being currently used, and adjust the same into a reception beam for receiving downlink transmission. And, the first electronic device 101 can measure a quality of a wireless signal, by using a reference signal received from a base station through a beam pair link formed by the selected reception beam, and can use continuously in response to the wireless signal quality being greater than a previously set threshold but again select another reception beam in response to being less than the threshold. In the aforementioned selection, the first electronic device 101 has selected by using wireless signal quality information stored for another beam pair link including a transmission beam included in a beam pair link which is being currently used, but can select on the basis of wireless signal quality information about all beam pair links irrespective of a base station transmission beam which is being currently used. For example, the first electronic device 101 can select a beam pair link whose wireless signal quality is best among other beam pair links including the transmission beam of the beam pair link which is being currently used or select a reception beam of a beam pair link whose wireless signal quality appears to be best among all beam pair links irrespective of the transmission beam of the beam pair link which is being currently used as well. In this case, the first electronic device 101 can request a change of a transmission beam to a base station, in response to a base station transmission beam included in the selected beam pair link being different from a transmission beam of a beam pair link which is currently ever used.

The operation of selecting at least one reception beam in accordance with the aforementioned various embodiments can perform an operation of selecting at least one reception beam on the basis of an operation combining two or more operations as well. In an embodiment, the first electronic device 101 can select a reception beam of a beam pair link whose wireless signal quality stored for the beam pair link including this reception beam is best among reception beams in which an angle with a reception beam which is being currently used is within a specific value. In another embodiment, the first electronic device 101 can unintentionally select at least one reception beam among reception beams included in the beam pair link in which the wireless signal quality stored for the beam pair link is equal to or is greater than a specific value as well.

According to various embodiments, in response to a quality of a wireless signal measured for stored formable all beam pair links being less than a previously set specific value, the first electronic device 101 can perform an operation for determining a new beam pair. In an embodiment, in response to the wireless signal quality measured for the stored formable all beam pair links being less than the previously set specific value, the first electronic device 101 can determine that all the beam pair links suffer the influence of inter-cell interference, and in order to mitigate or avoid the interference, can perform an operation for new transmission beam/reception beam pair determination together with the first base station 320. For example, the first base station 320 and the first electronic device 101 can perform an operation of determining a beam pair of a transmission beam/reception beam through a sweeping operation, to set new beam pairs. According to an embodiment, the new beam pair determination operation can include an operation of forming a new beam pair link.

According to various embodiments, the operation of determining the beam pair of the transmission beam and the reception beam can be performed within an interference occurrable duration wherein it can include the influence of inter-cell interference. While suffering the influence of inter-cell interference, the first electronic device 101 can select a beam pair of a transmission beam and a reception beam whose wireless signal quality is best and, by using a beam pair link formed by this beam pair, mitigate or avoid the influence of inter-cell interference.

According to various embodiments, in response to determining that inter-cell interference has occurred in an interference occurrable duration within a set TDD pattern, the first electronic device 101 can adjust a current reception beam to use a reception beam different from the current reception beam, and receive downlink transmission and, in response to escaping the interference occurrable duration, the first electronic device 101 can receive the downlink transmission by again using the originally used reception beam. At this time, in response to the first electronic device 101 supporting a plurality of antenna sets, it is possible to adjust a currently used antenna set into another antenna set as well and, in response to the first electronic device 101 receiving downlink transmission by using a plurality of reception beams, it can be possible to adjust to select at least one another reception beam and receive downlink transmission as well.

According to various embodiments, the reception beam adjusting method can be effective, when the first electronic device 101 exists in a boundary of the first cell 530 having influence on performance degradation because a signal intensity of interference by the second electronic device 102 of the adjacent cell 321 performing uplink transmission is greater than a reception signal intensity for a signal transmitted from the first base station 320 of the first electronic device 101. Inter-cell interference mitigation or avoidance using the reception beam adjusting method can be an operation being effective in instantly coping with when a sudden wireless signal quality change takes place in a symbol and/or slot within the interference occurrable duration.

Figure 12:
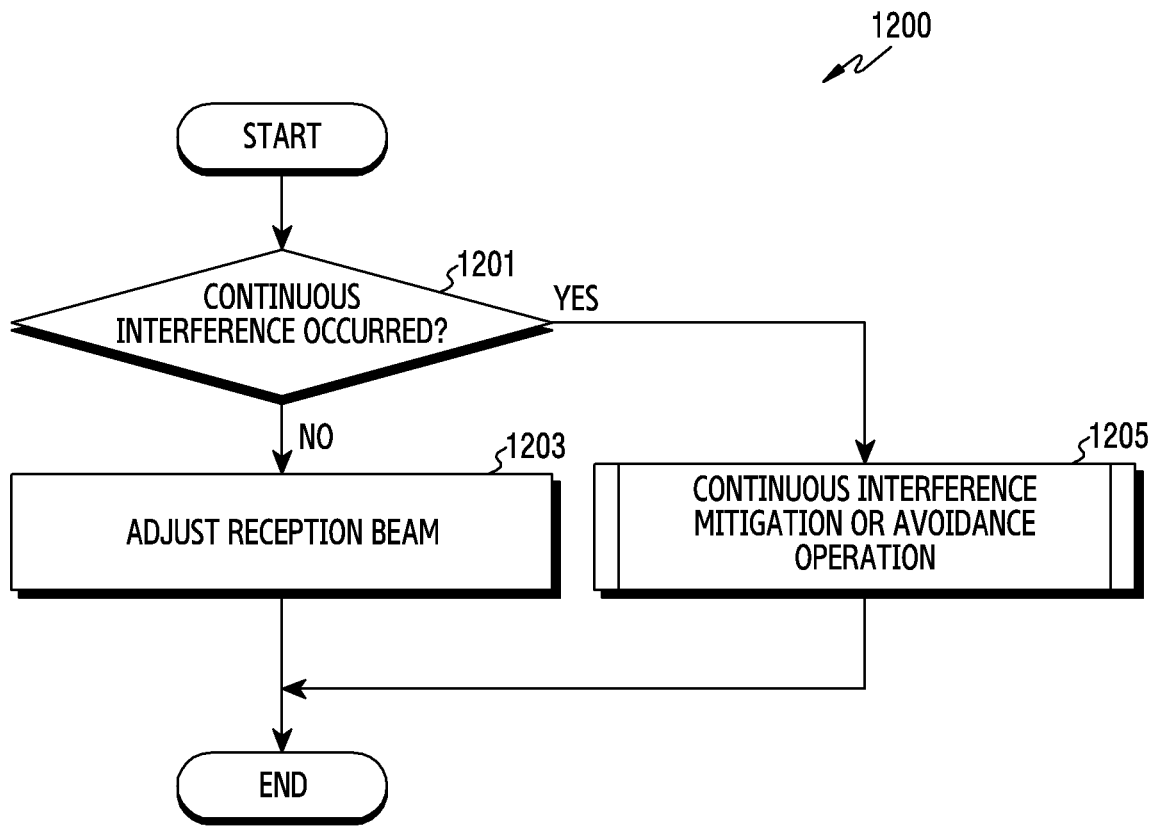
FIG. 12 is a flowchart illustrating an operation of mitigating or avoiding inter-cell interference by an electronic device according to another embodiment.
Figure 13:
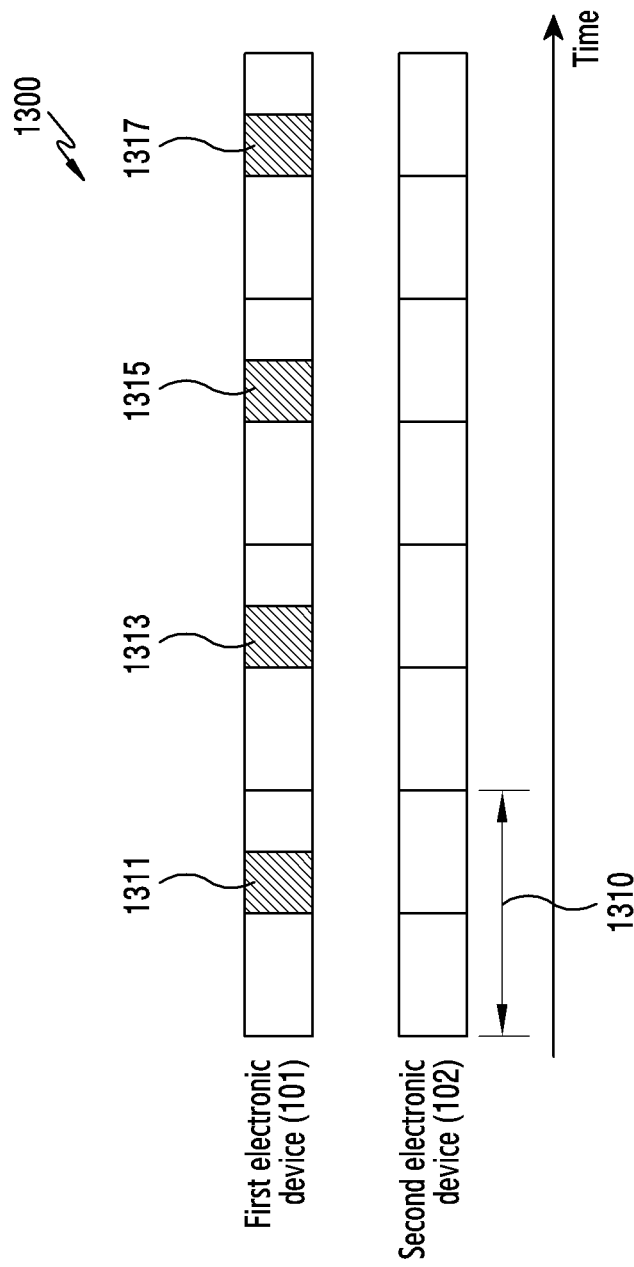
FIG. 13 is a diagram illustrating a case in which the deterioration of a wireless signal quality continuously takes place in an interference occurrable duration according to an embodiment.

FIG. 12 is a flowchart 1200 illustrating an operation of mitigating or avoiding inter-cell interference in the first electronic device 101 according to another embodiment. FIG. 13 is a diagram 1300 illustrating a case in which wireless signal quality degradation continuously takes place in an interference occurrable duration according to an embodiment. The flowchart 1200 exemplified in FIG. 12 is an embodiment of operation 609 of FIG. 6, and an operation subject can be understood as an electronic device (e.g., the electronic device 101 of FIG. 1) or a component (e.g., the processor 120 of FIG. 1) of the electronic device 101.

According to various embodiments, in operation 1201, the first electronic device 101 (e.g., the processor 120) can determine whether continuous interference takes place. In an embodiment, the first electronic device 101 can monitor whether inter-cell interference has occurred continuously in an interference occurrable duration during a previously set cycle. For example, referring to FIG. 13, a TDD pattern set to each cell can be repeated by specified periods, and in an embodiment, one TDD pattern region 1310 proposed in FIG. 13 can correspond to FIG. 7. Interference occurrable durations 1311, 1313, 1315 and 1317 exist every cycle and, in response to the second electronic device 102 of the adjacent cell 351 performing uplink transmission every cycle, wireless signal quality and/or performance degradation by inter-cell interference can take place in each of the interference occurrable durations 1311, 1313, 1315, and 1317 continuously, not instantly.

According to various embodiments, in response to determining that continuous interference does not occur (No), in operation 1203, the first electronic device 101 can adjust a reception beam receiving downlink transmission, as a response to an instant interference. For example, the electronic device 101 can use a reception beam different from a reception beam which is being currently used.

According to various embodiments, in response to determining that the continuous interference has occurred (Yes), in operation 1205, the first electronic device 101 can perform, as an operation of mitigating or avoiding the continuous interference, at least one operation among an operation of iteratively performing reception beam adjustment at each interference, an operation of requesting BWP change, or an operation for changing the setting of a beam pair of a transmission beam of a base station and a reception beam of an electronic device. For example, any one of the aforementioned operations can be used fixedly, or be used adaptively according to situation.

In an embodiment, the first electronic device 101 can iteratively perform reception beam adjustment. In response to interference occurrence being obtained in an interference occurrable duration (e.g., 710 of FIG. 7), the first electronic device 101 can temporarily adjust a current reception beam into another reception beam and, in response to escaping the interference occurrable duration, can again use the original reception beam. At this time, the first electronic device 101 can use a reception beam selected in a duration in which interference occurrence has been obtained before, straight without performing various embodiments for the aforementioned reception beam selection, as well.

In an embodiment, the first electronic device 101 can perform an operation of changing a currently activated BWP to activate another BWP. The operation of changing to activate the another BWP can be performed through an operation with a base station which responds to a request of an electronic device.

Figure 14:
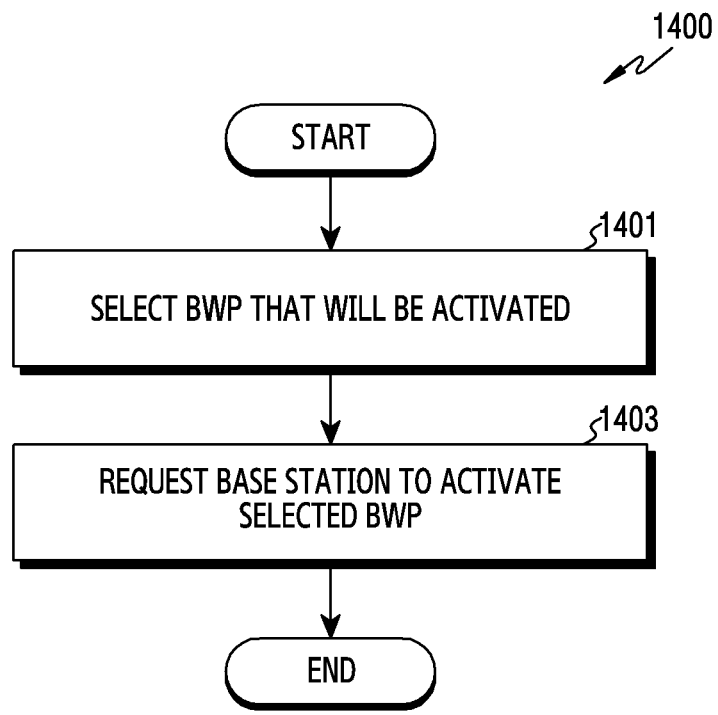
FIG. 14 is a flowchart illustrating an operation for activating another BWP in a first electronic device according to an embodiment.

FIG. 14 is a flowchart 1400 illustrating an operation for activating another BWP in the first electronic device 101 according to an embodiment. The flowchart 1400 exemplified in FIG. 14 is an embodiment of operation 1205 of FIG. 12, and an operation subject can be understood as an electronic device (e.g., the electronic device 101 of FIG. 1) or a component (e.g., the processor 120 of FIG. 1) of the electronic device 101.

According to various embodiments, in operation 1401, the first electronic device 101 (e.g., the processor 120) can select a BWP which will be activated. The first electronic device 101 can recognize continuous interference and thereafter, select one of at least one non-activated BWP, not a currently activated BWP. According to the 5G NR system standard defined in 3GPP, a plurality of BWPs can be set, and at least one BWP among the plurality of BWPs is activated and used for data communication with a base station, and the remnant BWP can be in a non-activated state. The first electronic device 101 cannot perform data communication by using the non-activated BWP, and can merely receive an SSB only. Accordingly, the first electronic device 101 can select a BWP which will be activated among the at least one non-activated BWP for the sake of BWP change.

According to various embodiments, in operation 1403, the first electronic device 101 can request to activate the selected BWP to the first base station 320, to request BWP change. For example, the first electronic device 101 can request to activate the selected BWP to the first base station 320, by transmitting a scheduling request (SR) signal of requesting to allocate the selected BWP a resource for uplink transmission to the first base station 320. In an embodiment, a method for transmitting the SR signal by using an SR resource included in an activated BWP which is set to associate with the selected BWP can be possible. The association of the at least one SR resource and the at least one BWP can be set through an RRC message at a time point at which a terminal gain access to a base station.

The operation of selecting by the first electronic device 101 the BWP which will be activated can include at least one operation, or an operation combining two or more operations, among an operation of selecting a BWP in which a frequency band position is spaced apart most distant from a currently activated BWP, or an operation of selecting a BWP whose bandwidth is least, or an operation of measuring a quality of a wireless signal for a non-activated BWP and selecting a BWP whose measured wireless signal quality is best. According to various embodiments, the combined operation can include the operation of selecting the BWP whose measured wireless signal quality is best among BWPs whose bandwidth is less than a specific value, the operation of selecting the BWP in which the frequency band position is spaced apart most distant from the currently activated BWP among the BWPs whose bandwidth is less than the specific value, and the operation of selecting the BWP whose measured wireless signal quality is best among the BWPs in which the frequency band position is spaced a specific value or more apart from the currently activated BWP.

At this time, for the sake of a non-activated BWP, the first electronic device 101 can measure a wireless signal quality by using an SSB included in the corresponding BWP. For example, in response to being able to use a CSI-RS allocated already or allocated by a request, the first electronic device 101 can measure a wireless signal quality of non-activated BWPs by using the allocated CSI-RS. The wireless signal quality measurement can be proper to be performed within an interference occurrable duration, but can be performed regardless of the interference occurrable duration as well.

Figure 15:
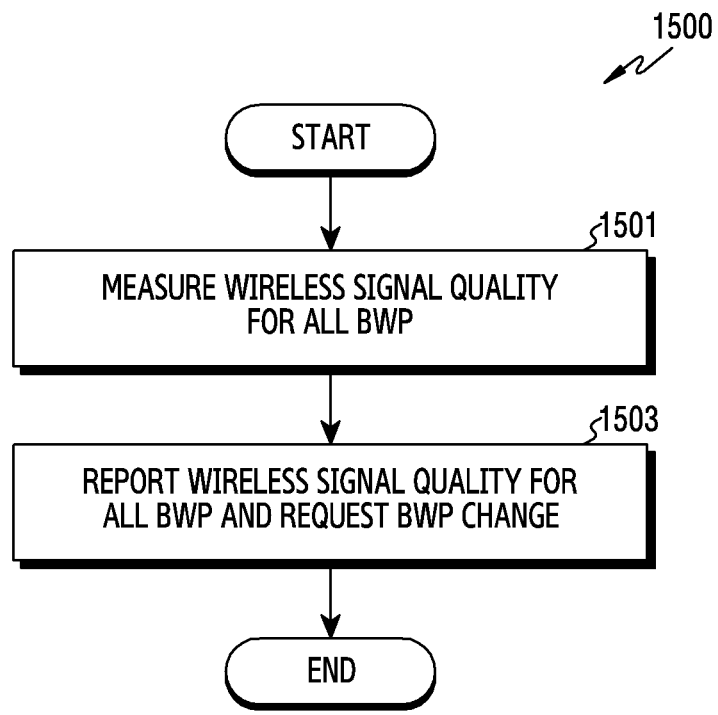
FIG. 15 is a flowchart illustrating an operation for activating another BWP in a first electronic device according to another embodiment.

FIG. 15 is a flowchart 1500 illustrating an operation for activating another BWP in the first electronic device 101 according to another embodiment. The flowchart 1500 exemplified in FIG. 15 is an embodiment of operation 1205 of FIG. 12, and an operation subject can be understood as an electronic device (e.g., the electronic device 101 of FIG. 1) or a component (e.g., the processor 120 of FIG. 1) of the electronic device 101.

According to various embodiments, in operation 1501, the first electronic device 101 (e.g., the processor 120) can recognize continuous interference and thereafter, measure a quality of a wireless signal for all BWPs. For a non-activated BWP, the first electronic device 101 can measure the quality of the wireless signal by using an SSB included in the corresponding BWP. For example, in response to being able to use a CSI-RS allocated already or allocated by a request, the first electronic device 101 can use this to measure the quality of the wireless signal of the BWPs. The wireless signal quality measurement can be proper to be performed within an interference occurrable duration in which the influence of inter-cell interference takes place.

According to various embodiments, in operation 1503, the first electronic device 101 can report the wireless signal quality measured for all the BWPs to a base station and request a BWP change. The first base station 320 can change the BWP under its own determination. In an embodiment, the first base station 320 can select and newly activate a BWP having the best wireless signal quality on the basis of the received wireless signal quality for all the BWPs. In another embodiment, the first base station 320 can select a BWP spaced apart most distant in a frequency band position from a currently activated BWP, or select and newly activate a BWP whose bandwidth is least. In response to the first base station 320 selecting the currently activated BWP as a BWP which will be activated, the first base station 320 can maintain to use the original currently activated BWP without an operation of activating a new BWP as well.

An operation of another embodiment of the first electronic device 101 for activating another BWP can be an operation of transmitting a sound reference signal (SRS) through set all BWPs. The first base station 320 can measure an SRS received through available all BWPs and change the activated BWP. In an embodiment, the first base station 320 can select and newly activate a BWP measured as having the best wireless signal quality on the basis of a wireless signal quality measured for the SRS received through all BWPs. In another embodiment, the first base station 320 can select a BWP spaced apart most distant in a frequency band position from a currently activated BWP, or select and newly activate a BWP whose bandwidth is least. In response to the currently activated BWP being selected as the BWP which will be activated, the first base station 320 can maintain to use the original currently activated BWP without an operation of activating a new BWP as well.

According to an embodiment, all BWPs allocated to the first electronic device 101 can suffer the influence of inter-cell interference. For example, in response to wireless signal qualities measured for all the BWPs all are equal to or are less than a previously set specified value, the first electronic device 101 can determine that all the BWPs suffer the influence of inter-cell interference. In this case, although an activated BWP is changed, inter-cell interference may not be mitigated or avoided. In this case, in accordance with the above-described embodiment, while transmitting wireless signal quality information measured for the remnant BWP excepting the activated BWP to the first base station 320 or by performing re-access through a cell-defined SSB, the first electronic device 101 can request resetting for a BWP to the first base station 320. The first base station 320 can determine that there is not currently a suitable BWP on the basis of the received wireless signal quality information measured for the BWP, and determine a new BWP, and instruct to reset the BWP to the first electronic device 101. By activating at least one of newly set BWPs, the first electronic device 101 can avoid the inter-cell interference.

According to various embodiments, in BWP selection, when the first electronic device 101 and the second electronic device 102 of the adjacent cell 321 are scheduled to a resource of the same position to directly exert the influence of interference, or exert influence on a noise characteristic of the first electronic device 101 due to a signal leakage into an adjacent channel, the first electronic device 101 or the first base station 320 can select a BWP in which a frequency position used is changed. When the first electronic device 101 and the second electronic device 102 of the adjacent cell 321 are scheduled to resources of different positions but a signal leakage into an adjacent channel exerts influence on signal orthogonality in an FFT transform operation of the first electronic device 101, the first electronic device 101 or the first base station 320 can select a BWP which sharpens a BWP width, that is, a frequency band magnitude instead of changing a frequency position used, thereby decreasing the influence of interference.

In an embodiment, to solve continuous interference, the first electronic device 101 can perform an operation of setting a new beam pair of a transmission beam and a reception beam. In response to the first electronic device 101 determining that the continuous interference has occurred, the first electronic device 101 can request new beam pair setting to the first base station 320. Then, the first base station 320 and the first electronic device 101 can perform an operation of determining a beam pair of a transmission beam and a reception beam carried out in course of an initial access operation, to set the new beam pair. At this time, the operation of determining the beam pair of the transmission beam and the reception beam can be performed within an interference occurrable duration wherein the influence of inter-cell interference can be included. Then, a beam pair of a transmission beam and a reception beam whose wireless signal quality is best can be selected and used in course of suffering the influence of inter-cell interference, whereby the influence of inter-cell interference can be mitigated or avoided.

According to various embodiments, the operation of the first electronic device 101 proposed in FIG. 6 can be performed all the time without a specific execution condition. However, because a possibility in which inter-cell interference occurs is high when the first electronic device 101 is located outside a cell, in accordance with another embodiment, the operations of FIG. 6 can be performed only when satisfying the specific execution condition as well. In an embodiment, the first electronic device 101 can trigger the inter-cell interference avoidance or mitigation operation proposed in FIG. 6, when an intensity of a signal received from a base station (e.g., the first base station 320 of FIG. 5) of a serving cell (e.g., the first cell 530 of FIG. 5) that itself has accessed is decreased to a threshold or less, and at least one adjacent cell using the same frequency is obtained. Here, the threshold can be previously defined as a value in which it is determined that the first electronic device 101 can escape from a central portion of the serving cell 530 and suffer the influence of inter-cell interference. In another embodiment, when at least one adjacent cell using the same frequency has been not only obtained but also a signal intensity received from the obtained adjacent cell is equal to or is greater than the threshold, the inter-cell interference avoidance or mitigation operation can be triggered. At this time, the threshold can be previously defined as a value in which it can be determined that the first electronic device 101 has approached near the adjacent cell 531.

According to various embodiments, an operating method of an electronic device (e.g., the electronic device 101) can include forming a first beam pair link with a first transmission beam radiated from a first base station by using a first reception beam having a first direction, acquiring information about a first time division duplex (TDD) pattern indicating a TDD sequence set in a serving cell formed by the first base station, and information about a second TDD pattern indicating a TDD sequence set in an adjacent cell adjacent to a serving cell formed by a second base station, selecting a first portion among the first TDD pattern on the basis of the information about the first TDD pattern and the information about the second TDD pattern, obtaining whether interference has occurred in the first portion, and forming a second beam pair link with one of transmission beams radiated from the second base station by using a second reception beam having a second direction different from the first direction, in response to the interference being determined to have occurred.

According to various embodiments, an operating method of an electronic device (e.g., the electronic device 101) can include forming a first beam pair link with a first transmission beam radiated from a first base station, acquiring information about a first TDD (time division duplex) pattern indicating a TDD sequence set in a serving cell formed by the first base station, and information about a second TDD pattern indicating a TDD sequence set in an adjacent cell adjacent to a serving cell formed by a second base station, selecting a first portion among the first TDD pattern on the basis of the information about the first TDD pattern and the information about the second TDD pattern, obtaining whether interference has occurred in the first portion, and transmitting a request for changing into a BWP different from a first BWP, in response to the interference being determined to have occurred.

According to various embodiments, the TDD pattern can indicate a sequence for duplex in a plurality of orthogonal frequency division multiplexing (OFDM) symbols, and the duplex can be one of downlink transmission in which data is transmitted from a base station to an electronic device, uplink transmission in which data is transmitted from an electronic device to a base station, and flexible transmission usable as not only the downlink transmission but also the uplink transmission, and the first portion can include at least one OFDM symbol among the plurality of OFDM symbols.

According to various embodiments, the first portion can be an OFDM symbol duration in which, by the first TDD pattern, duplex is the downlink transmission or the flexible transmission and, by the second TDD pattern, duplex is the uplink transmission or the flexible transmission.

According to various embodiments, obtaining whether the interference has occurred can include receiving a wireless signal on the basis of the first TDD pattern by using the first beam pair link, measuring an intensity of the wireless signal in at least a portion among the first portion, and determining that the interference has occurred, in response to the measured intensity of the wireless signal being less than a threshold.

According to various embodiments, obtaining whether the interference has occurred can include receiving a wireless signal on the basis of the first TDD pattern, by using the first beam pair link, measuring an intensity of the wireless signal in at least a portion among the first portion, and determining that the interference has occurred, when where the measured intensity of the wireless signal is less than a threshold takes place at least twice or more.

According to various embodiments, the method can further include, after the first portion, again forming the first beam pair link by using the first reception beam and the first transmission beam.

According to various embodiments, obtaining whether the interference has occurred can include determining a block error rate (BLER) indicating a block error rate of data received within the first portion, and determining that interference has occurred, in response to the BLER being increased more than a specific value, or the BLER being increased by a specific rate or more compared to an average BLER, or the BLER being increased by a specific value or more compared to the average BLER.

According to various embodiments, the second BWP can be selected among BWPs excepting the first BWP among the plurality of BWPs set for the electronic device, wherein the second BWP can select a BWP that uses a frequency band position spaced apart most distant from a frequency band position used by the first BWP, or select a BWP whose bandwidth is least, or measure a wireless signal quality for each of the plurality of BWPs excepting the first BWP, and selects a BWP whose wireless signal quality is best.

According to various embodiments, an operating method of an electronic device (e.g., the electronic device 101) can include recognizing an interference occurrable duration, and obtaining whether interference has occurred in the interference occurrable duration, and in response to determining that the interference has occurred, changing a reception beam or bandwidth part (BWP) used in the electronic device. Changing the reception beam or the BWP can include at least one of adjusting the reception beam, or requesting BWP change, or changing the setting of a beam pair of a base station transmission beam and an electronic device reception beam, or requesting BWP resetting.

According to various embodiments, recognizing the interference occurrable duration can include recognizing the interference occurrable duration on the basis of at least one of a time division duplex (TDD) pattern set in the electronic device, a TDD pattern set in a serving cell, or a TDD pattern set in an adjacent cell.

According to various embodiments, the interference occurrable duration can include a time duration in which the serving cell is a downlink duration where data is transmitted from a base station to an electronic device (e.g., the electronic device 101) and the adjacent cell is an uplink duration where data is transmitted from an electronic device to a base station, or a time duration in which the serving cell is a downlink duration where data is transmitted from a base station to an electronic device and the adjacent cell is a flexible duration which can be used for downlink transmission or uplink transmission.

According to various embodiments, the interference occurrable duration can be recognized on the basis of TDD patterns set in a plurality of adjacent cells, or be recognized on the basis of only a TDD pattern set in an adjacent cell in which a measured wireless signal quality is equal to or is greater than a threshold among the plurality of adjacent cells, or be recognized on the basis of only a TDD pattern set in an N number of adjacent cells in order in which the measured wireless signal quality is high among the plurality of adjacent cells, or be recognized on the basis of only a TDD pattern set in an adjacent cell in which the measured wireless signal quality is highest among the plurality of adjacent cells.

According to various embodiments, the method can, in response to failing to acquire the TDD pattern set in the adjacent cell, recognize the entire downlink duration of a TDD pattern set in the serving cell as the interference occurrable duration.

According to various embodiments, obtaining whether the interference has occurred can include receiving a reference signal set each outside the interference occurrable duration and within the interference occurrable duration, and measuring a wireless signal quality outside the interference occurrable duration and within the interference occurrable duration by using the reference signal, and determining that interference has occurred, in response to a wireless signal quality measured within the interference occurrable duration has been deteriorated by a specific value or more or a specific rate or more compared to a wireless signal quality measured outside the interference occurrable duration.

According to various embodiments, obtaining whether the interference has occurred can include receiving a reference signal set within the interference occurrable duration, and measuring a wireless signal quality by using the received reference signal, and estimating an average of the wireless signal quality measurement value, and determining that interference has occurred, in response to the measured wireless signal quality has been deteriorated more than the estimated average value by a specific value or more or a specific rate or more.

According to various embodiments, obtaining whether the interference has occurred can include determining a block error rate (BLER) indicating a block error rate of data received within the interference occurrable duration, and determining that interference has occurred, in response to the BLER being increased more than a specific value, or the BLER being increased by a specific rate or more compared to an average BLER, or the BLER being increased by a specific value or more compared to the average BLER.

According to various embodiments, determining that interference has occurred in response to the BLER being increased more than a specific value, or the BLER being increased by a specific rate or more compared to an average BLER, or the BLER being increased by a specific value or more compared to the average BLER, can include measuring a wireless signal quality by using a reference signal between transmitted data in response to the BLER being increased more than a specific value, or the BLER being increased by a specific rate or more compared to an average BLER, or the BLER being increased by a specific value or more compared to the average BLER, and determining that interference has occurred on the basis of a result of comparing the measured wireless signal quality with a previously measured wireless signal quality or an average of the measured wireless signal quality.

According to various embodiments, determining that interference has occurred in response to the BLER being increased more than a specific value, or the BLER being increased by a specific rate or more compared to an average BLER, or the BLER being increased by a specific value or more compared to the average BLER, can include measuring a wireless signal quality by using a reference signal between transmitted data in response to the BLER being increased more than a specific value, or the BLER being increased by a specific rate or more compared to an average BLER, or the BLER being increased by a specific value or more compared to the average BLER, and estimating an intensity of an interference signal on the basis of the measured wireless signal quality, and determining that interference has occurred in response to the estimated intensity of the interference signal being equal to or being greater than a threshold.

According to various embodiments, adjusting the reception beam can include selecting at least one reception beam among the remnant reception beams excepting a reception beam which is being currently used among a plurality of reception beams formable by the electronic device, and measuring a wireless signal quality for the selected at least one reception beam, and adjusting to receive downlink transmission by using the selected at least one reception beam in response to the measured wireless signal quality being greater than a previously set threshold, and again selecting at least one reception beam in response to the measured wireless signal quality being less than the previously set threshold.

According to various embodiments, selecting the at least one reception beam can include selecting the at least one reception beam on the basis of one operation, or an operation combining two or more operations, among selecting at least one reception beam randomly among the remnant reception beams excepting a reception beam which is being currently used among a plurality of reception beams formable by the electronic device, and selecting a reception beam which can be formed closest to the reception beam which is being currently used among the remnant reception beams excepting the reception beam which is being currently used among the plurality of reception beams formable by the electronic device, and selecting a reception beam on the basis of wireless signal quality information about each pair of a base station transmission beam and an electronic device reception beam previously stored among the remnant reception beams excepting the reception beam which is being currently used among the plurality of reception beams formable by the electronic device.

According to various embodiments, the method can perform an operation for changing the setting of the pair of the base station transmission beam and the electronic device reception beam, in response to the measured wireless signal quality being less than the previously set threshold for all the remnant reception beams excepting the reception beam which is being currently used among the plurality of reception beams formable by the electronic device.

According to various embodiments, the method can further include, when determining whether interference has occurred and performing an operation of adjusting the original reception beam into a new reception beam, adjusting to again use the original reception beam, in response to escaping the interference occurrable duration.

According to various embodiments, at least one of, in response to determining that interference has occurred, adjusting a reception beam, requesting BWP change, and changing the setting of the pair of the base station transmission beam and the electronic device reception beam or requesting BWP resetting can include determining whether continuous interference has occurred, and in response to determining that the continuous interference does not have occurred, performing an operation of adjusting a reception beam, and in response to determining that the continuous interference has occurred, performing at least one of performing the reception beam adjustment iteratively at each interference, or requesting the BWP change, or changing the setting of the pair of the base station transmission beam and the electronic device reception beam, or requesting the BWP resetting.

According to various embodiments, requesting the BWP change can include selecting a BWP which will be activated among at least one non-activated BWP, and requesting to activate the selected BWP to the base station.

According to various embodiments, selecting the BWP which will be activated can include one operation, or an operation combining two or more operations, among selecting a BWP in which a frequency band position is spaced apart most distant from a currently activated BWP, or selecting a BWP whose bandwidth is least, or measuring a wireless signal quality measured for the non-activated BWP, and selecting a BWP whose wireless signal quality is best.

According to various embodiments, requesting to activate the selected BWP to the base station can include transmitting one of a scheduling request (SR) signal of requesting to allocate the selected BWP a resource for uplink transmission to the base station, a wireless signal quality for a plurality of BWPs, or a sound reference signal (SRS) through set all BWPs.

The present document discloses various embodiments capable of mitigating or avoiding inter-cell interference which can take place according as duplex between adjacent cells are mutually different in 5G NR. By using at least one of various embodiments disclosed in the present document, the present document can prevent a decrease of reception performance of an electronic device in a 5G NR dynamic TDD environment.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a housing;
at least one antenna array comprising antenna elements disposed within the housing or formed in a portion of the housing;
a processor electrically or operably connected with the antenna array, and configured to form a plurality of reception beams (Rx beams) having mutually different directions by using the antenna array; and
a memory operably connected with the processor,
wherein the memory stores instructions that, upon execution, enable the processor to:
form a first beam pair link with a first transmission beam radiated from a first base station by using a first reception beam having a first direction;
acquire information about a first time division duplex (TDD) pattern indicating a TDD sequence set in a serving cell formed by the first base station, and information about a second TDD pattern indicating a TDD sequence set in an adjacent cell adjacent to a serving cell formed by a second base station;
identify at least one symbol corresponding to both a downlink transmission duration of the first TDD pattern and an uplink transmission duration of the second TDD pattern;
determine a first portion corresponding to the at least one symbol among the first TDD pattern as a portion in which interference is able to occur;
obtain whether the interference has occurred in the first portion; and
form a second beam pair link with one of transmission beams radiated from the second base station by using a second reception beam having a second direction different from the first direction, in response to the interference being determined to have occurred.

2. The electronic device of claim 1, wherein the TDD pattern indicates a sequence for duplex in a plurality of orthogonal frequency division multiplexing (OFDM) symbols,
wherein the duplex is one of downlink transmission in which data is transmitted from a base station to the electronic device, uplink transmission in which data is transmitted from the electronic device to the base station, and flexible transmission usable as not only the downlink transmission but also the uplink transmission, and
wherein the first portion comprises at least one OFDM symbol among the plurality of OFDM symbols.

3. The electronic device of claim 2, wherein the instructions enable the processor to select, as an interference occurrable duration, an OFDM symbol duration in which duplex by the first TDD pattern is the downlink transmission or the flexible transmission, and duplex by the second TDD pattern is the uplink transmission or the flexible transmission.

4. The electronic device of claim 1, wherein the instructions enable the processor to:
receive a wireless signal on the basis of the first TDD pattern by using the first beam pair link;
measure an intensity of the wireless signal in at least a portion among the first portion; and
determine that interference has occurred, in response to the measured intensity of the wireless signal being less than a threshold.

5. The electronic device of claim 1, wherein the instructions enable the processor to, after the first portion, again form the first beam pair link by using the first reception beam and the first transmission beam.

6. The electronic device of claim 1, wherein the instructions enable the processor to:
determine a block error rate (BLER) indicating a block error rate of data received within the first portion; and
determine that interference has occurred, in response to the BLER being increased more than a specific value, or the BLER being increased by a specific rate or more compared to an average BLER, or the BLER being increased by a specific value or more compared to the average BLER.

7. The electronic device of claim 1, wherein the instructions enable the processor to:
select, as the second reception beam, at least one reception beam randomly among a plurality of reception beams providable by the electronic device except the first reception beam, or
select, as the second reception beam, a reception beam providable closest to the first reception beam among the plurality of reception beams providable by the electronic device except the first reception beam, or
select, as the second reception beam, a reception beam comprised in a beam pair link having the best wireless signal quality among the plurality of reception beams providable by the electronic device except the first reception beam, on the basis of wireless signal quality information about each previously stored beam pair link.

8. An electronic device comprising:
a housing;
at least one antenna array comprising antenna elements disposed within the housing or formed in a portion of the housing;
a processor electrically or operably connected with the antenna array, and configured to form a plurality of reception beams (Rx beams) having mutually different directions by using the antenna array; and
a memory operably connected with the processor,
wherein the memory stores instructions that, upon execution, enable the processor to:
form a first beam pair link with a first transmission beam radiated from a first base station;
acquire information about a first TDD (time division duplex) pattern indicating a TDD sequence set in a serving cell formed by the first base station, and information about a second TDD pattern indicating a TDD sequence set in an adjacent cell adjacent to a serving cell formed by a second base station;
identify at least one symbol corresponding to both a downlink transmission duration of the first TDD pattern and an uplink transmission duration of the second TDD pattern;
determine a first portion corresponding to the at least one symbol among the first TDD pattern as a portion in which interference is able to occur;
obtain whether the interference has occurred in the first portion; and
transmit a request for changing into a second bandwidth part (BWP) different from a first bandwidth part (BWP) among a plurality of bandwidth parts (BWPs) which is set for the electronic device, to the first base station, in response to the interference being determined to have occurred.

9. The electronic device of claim 8, wherein the instructions enable to the processor to:
receive a wireless signal on the basis of the first TDD pattern, by using the first beam pair link;
measure an intensity of the wireless signal in at least a portion among the first portion; and
determine that interference has occurred, when where the measured intensity of the wireless signal is less than a threshold takes place at least twice or more.

10. The electronic device of claim 8, wherein the instructions enable to the processor to select the second BWP among the plurality of BWPs set for the electronic device except the first BWP,
wherein the processor selects a BWP that uses a frequency band position spaced apart most distant from a frequency band position used by the first BWP, or
selects a BWP whose bandwidth is least, or
measures a wireless signal quality for each of the plurality of BWPs excepting the first BWP, and selects a BWP whose wireless signal quality is best.

11. An operating method of an electronic device, the method comprising:
forming a first beam pair link with a first transmission beam radiated from a first base station by using a first reception beam having a first direction;
acquiring information about a first time division duplex (TDD) pattern indicating a TDD sequence set in a serving cell formed by the first base station, and information about a second TDD pattern indicating a TDD sequence set in an adjacent cell adjacent to a serving cell formed by a second base station;
identifying at least one symbol corresponding to both a downlink transmission duration of the first TDD pattern and an uplink transmission duration of the second TDD pattern;
determining a first portion corresponding to the at least one symbol among the first TDD pattern as a portion in which interference is able to occur;
obtaining whether the interference has occurred in the first portion; and
forming a second beam pair link with one of transmission beams radiated from the second base station by using a second reception beam having a second direction different from the first direction, in response to the interference being determined to have occurred.

12. The method of claim 11, wherein obtaining whether the interference has occurred comprises:
receiving a wireless signal on the basis of the first TDD pattern by using the first beam pair link;
measuring an intensity of the wireless signal in at least a portion among the first portion; and
determining that the interference has occurred, in response to the measured intensity of the wireless signal being less than a threshold.

13. The method of claim 11, wherein obtaining whether the interference has occurred comprises:
determining a block error rate (BLER) indicating a block error rate of data received within the first portion; and determining that the interference has occurred, in response to the BLER being increased more than a specific value, or the BLER being increased by a specific rate or more compared to an average BLER, or the BLER being increased by a specific value or more compared to the average BLER.

14. An operating method of an electronic device, the method comprising:
  forming a first beam pair link with a first transmission beam radiated from a first base station;
  acquiring information about a first TDD (time division duplex) pattern indicating a TDD sequence set in a serving cell formed by the first base station, and information about a second TDD pattern indicating a TDD sequence set in an adjacent cell adjacent to a serving cell formed by a second base station;
  identifying at least one symbol corresponding to both a downlink transmission duration of the first TDD pattern and an uplink transmission duration of the second TDD pattern;
  determining a first portion corresponding to the at least one symbol among the first TDD pattern as a portion in which interference is able to occur;
  obtaining whether the interference has occurred in the first portion; and
  transmitting a request for changing into a second bandwidth part (BWP) different from a first BWP, to the first base station, in response to the interference being determined to have occurred.

15. The method of claim 14, wherein the second BWP is selected among BWPs excepting the first BWP among a plurality of BWPs set for the electronic device,
  wherein the second BWP selects a BWP that uses a frequency band position spaced apart most distant from a frequency band position used by the first BWP, or
  selects a BWP whose bandwidth is least, or
  measures a wireless signal quality for each of the plurality of BWPs excepting the first BWP, and selects a BWP whose wireless signal quality is best.

* * * * *